US012070035B2

(12) United States Patent
Gao et al.

(10) Patent No.: US 12,070,035 B2
(45) Date of Patent: Aug. 27, 2024

(54) HERBICIDAL MIXTURES

(71) Applicant: Monsanto Technology LLC, St. Louis, MO (US)

(72) Inventors: Jingsi Gao, St. Louis, MO (US); Alison MacInnes, Wildwood, MO (US)

(73) Assignee: MONSANTO TECHNOLOGY LLC, Saint Louis, MO (US)

( * ) Notice: Subject to any disclaimer, the term of this patent is extended or adjusted under 35 U.S.C. 154(b) by 19 days.

(21) Appl. No.: 16/230,262

(22) Filed: Dec. 21, 2018

(65) Prior Publication Data

US 2019/0208786 A1 Jul. 11, 2019

Related U.S. Application Data

(60) Provisional application No. 62/609,876, filed on Dec. 22, 2017.

(51) Int. Cl.
*A01N 25/22* (2006.01)
*A01N 25/30* (2006.01)
*A01N 37/40* (2006.01)
*A01N 57/20* (2006.01)

(52) U.S. Cl.
CPC ............. *A01N 57/20* (2013.01); *A01N 25/22* (2013.01); *A01N 25/30* (2013.01); *A01N 37/40* (2013.01)

(58) Field of Classification Search
CPC ........ A01N 37/40; A01N 57/20; A01N 25/30; A01N 25/22
See application file for complete search history.

(56) References Cited

U.S. PATENT DOCUMENTS

| | | | |
|---|---|---|---|
| 5,035,738 A | 7/1991 | Burns et al. | |
| 5,389,598 A | 2/1995 | Berk et al. | |
| 5,703,014 A | 12/1997 | Caulder et al. | |
| 5,877,112 A | 3/1999 | Roberts et al. | |
| 6,200,929 B1 | 3/2001 | Horibe et al. | |
| 6,541,424 B2 | 4/2003 | Roberts et al. | |
| 6,831,038 B2 | 12/2004 | Volgas et al. | |
| 6,906,004 B2 | 6/2005 | Parrish et al. | |
| 7,012,040 B2 | 3/2006 | Hacker et al. | |
| 8,268,749 B2 | 9/2012 | Wright et al. | |
| 8,337,900 B2 | 12/2012 | CasanGiner et al. | |
| 8,987,167 B2 | 3/2015 | Xu et al. | |
| 9,078,432 B2 | 7/2015 | Long | |
| 2002/0094934 A1* | 7/2002 | Hacker ................ | A01N 57/20 504/127 |
| 2002/0108415 A1 | 8/2002 | Volgas et al. | |
| 2002/0160916 A1 | 10/2002 | Volgas et al. | |
| 2002/0160918 A1 | 10/2002 | Lewis et al. | |
| 2006/0270557 A1 | 11/2006 | Volgas et al. | |
| 2010/0248963 A1 | 9/2010 | Becher et al. | |
| 2010/0331182 A1 | 12/2010 | Zhang et al. | |
| 2011/0009269 A1 | 1/2011 | Gioia et al. | |
| 2011/0034332 A1 | 2/2011 | Becher et al. | |
| 2011/0166235 A1 | 7/2011 | Sun | |
| 2012/0142532 A1 | 6/2012 | Wright et al. | |
| 2012/0231956 A1 | 9/2012 | Rainbird | |
| 2012/0238451 A1 | 9/2012 | Feng et al. | |
| 2012/0289402 A1 | 11/2012 | Brown et al. | |
| 2012/0316065 A1 | 12/2012 | Sun | |
| 2013/0079228 A1 | 3/2013 | Freed | |
| 2013/0109572 A1 | 5/2013 | Pernak et al. | |
| 2013/0109725 A1 | 5/2013 | Dave et al. | |
| 2013/0225405 A1 | 8/2013 | Hixson et al. | |
| 2014/0013654 A1 | 1/2014 | Burke | |
| 2014/0128264 A1* | 5/2014 | Hemminghaus ....... | A01N 37/02 504/147 |
| 2014/0371069 A1* | 12/2014 | Alexander ............. | A01N 57/20 504/206 |
| 2015/0057157 A1 | 2/2015 | Baseeth et al. | |
| 2015/0264924 A1 | 9/2015 | Hemminghaus et al. | |
| 2015/0272116 A1 | 10/2015 | Zhang et al. | |
| 2016/0192645 A1 | 7/2016 | Zhang et al. | |
| 2017/0265477 A1 | 9/2017 | Baur et al. | |

FOREIGN PATENT DOCUMENTS

| | | |
|---|---|---|
| CN | 1176954 A | 3/1998 |
| CN | 101564044 A | 10/2009 |
| CN | 103371160 A | 10/2013 |
| EP | 1825750 A1 | 8/2007 |
| JP | 2013-520461 | 6/2013 |
| JP | 2017-500329 | 1/2017 |
| WO | 9007275 A1 | 7/1990 |
| WO | 1992012637 A1 | 8/1992 |
| WO | 9410844 A1 | 5/1994 |
| WO | 2000041567 A1 | 7/2000 |
| WO | 0126463 A1 | 4/2001 |

(Continued)

OTHER PUBLICATIONS

AGRI STAR® Diacamba DMA Salt Label and Material Safety Data Sheet, Aug. 2012, Albaugh, Inc., Ankeny, Iowa, found at http://www.cdms.net/labelsmsds/LMDefault.aspx?pd=4887&t. (36 pages).
BANVEL® Herbicide Label and Material Safety Data Sheet, 1999, Arysta LifeScience North America, LLC, Cary, North Carolina, found at http://www.cdms.net/labelsmsds/LMDefault.aspx?pd=92 &t. (29 pages).
BARRAGE HF® Label, 2005, Helena Chemical Company, Collierville, Tennessee, Label found at http://www.helenachemical.com/specialty/Labels/Barrage%20HF%20(5905-529).pdf. (12 pages).
CLARITY® Herbicide Label, 2010, BASF Corporation, Research Triangle Park, North Carolina, found at http://www.cdms.net/LDat/ld797012.pdf. (22 pages).

(Continued)

*Primary Examiner* — Johann R Richter
*Assistant Examiner* — Danielle Johnson

(57) ABSTRACT

The present invention generally relates to aqueous herbicidal compositions comprising a glufosinate component and an auxin herbicide component. The invention further relates to methods of preparing these compositions and methods of controlling unwanted plants using these compositions.

21 Claims, No Drawings

(56) References Cited

FOREIGN PATENT DOCUMENTS

| WO | 2002011536 | A2 | 2/2002 |
|---|---|---|---|
| WO | 02069718 | A2 | 9/2002 |
| WO | 2004080177 | A2 | 9/2004 |
| WO | 2008077196 | A1 | 7/2008 |
| WO | 2010053385 | A1 | 5/2010 |
| WO | 20100105047 | A2 | 9/2010 |
| WO | WO2011/104211 | A2 | 9/2011 |
| WO | 2013159731 | A1 | 10/2013 |
| WO | 2014071348 | A1 | 5/2014 |
| WO | WO2015/094884 | A1 | 6/2015 |
| WO | 216180857 | A1 | 11/2016 |
| WO | 2018231891 | A1 | 12/2018 |

OTHER PUBLICATIONS

DIABLO® Herbicide Label, 2011, Nufarm Americas Inc., Burr Ridge, Illinois, found at http://www.cdms.net/labelsmsds/LMDefault.aspx?pd=7398&t. (30 pages).
DISTINCT® Herbicide Label, Mar. 2012, BASF Corporation, Research Triangle Park, North Carolina, found at http://www.cdms.net/labelsmsds/LMDefault.aspx?pd=3700&t. (21 pages).
DURANGO® DMA® Herbicide Label, Jun. 2012, Dow AgroSciences LLC, Indianapolis, Indiana, found at http://www.cdms.net/labelsmsds/LMDefault.aspx?pd=8831&t. (36 pages).
FORMULA 40® Herbicide Label with EPA Re-Registration Approval dated Sep. 16, 2008, Dow AgroSciences, LLC, Indianapolis, Indiana, Label found at http://www.cdms.net/labelsmsds/LMDefault.aspx?pd=8600&t, and EPA Letter found at http://iaspub.epa.gov/apex/pesticides/f?p=PPLS:102:::NO::P102_REG_NUM:62719-1. (45 pages).
Honcho Plus® Herbicide Label, 2010, Monsanto Company, St. Louis, Missouri, found at http://www.cdms.net/labelsmsds/LMDefault.aspx?pd=6296&t. (26 pages).
International Search Report and Written Opinion for International Application No. PCT/US2018/067212 dated Mar. 18, 2019, 10 pages.
LIBERTY® 280 SL Herbicide Label, 2011, Bayer CropScience, Research Triangle Park, North Carolina, found at http://fs1.agrian.com/pdfs/Liberty_280_SL_Label2.pdf. (21 pages).
OPTI-AMINE® 2,4-D Amine Herbicide Label, Apr. 2012, Helena Chemical Company, Collierville, Tennessee, found at http://www.cdms.net/labelsmsds/LMDefault.aspx?pd=4410&t. (25 pages).
ORACLE® Dicamba Agricultural Herbicide Label, 2010, Gharda Chemicals Limited, Newtown, Pennsylvania, found at http://www.kellysolutions.com/ok/showproductinfo.asp?Product_Name=Oracle+Dicamba+Agricultural+Herbicide&EPA_Id=33658-30. (33 pages).
Roundup Powermax® Herbicide Label, 2010, Monsanto Company, St. Louis, Missouri, found at http://www.cdms.net/labelsmsds/LMDefault.aspx?pd=8837&t. (54 pages).
ROUNDUP WEATHERMAX® Herbicide Label, 2007, Monsanto Company, St. Louis, Missouri, found at http://www.cdms.net/labelsmsds/LMDefault.aspx?pd=6026&t. (49 pages).
Strachan et al., "Vapor Movement of Synthetic Auxin Herbicides: Aminocyclopyrachlor, Aminocyclopyrachlor-Methyl Ester, Dicamba, and Aminopyralid" Weed Science, 58:103-108 (2010).
TOUCHDOWN PRO® Herbicide Label, 2010, Sygenta Crop Protection, Inc., Greensboro, North Carolina, found at http://www.cdms.net/labelsmsds/LMDefault.aspx?pd=4875&t. (29 pages).
TRAXION® HERBICIDE Label, 2011, Syngenta Crop Protection, Inc., Greensboro, North Carolina, found at http://www.syngentacropprotection.com/labels/default.aspx. (64 pages).
VANQUISH® HERBICIDE Label, 2011, Syngenta Crop Protection, Inc., Greensboro, North Carolina, found at http://tirmsdev.com/Syngenta-Professional-Products-Vanquish-Herbicide-p90. (8 pages).
VISION® HERBICIDE Label, Jul. 25, 2012, Helena Chemical Company, Collierville, Tennessee, found at http://www.cdms.net/LabelsMsds/LMDefault.aspx?pd=9280&t. (25 pages).
WEEDAR 64® Broadleaf Herbicide Label with EPA Re-Registration Approval dated Sep. 8, 2010, Nufarms Americas Inc., Burr Ridge, Illinois, Label found at http://www.afpmb.org/sites/default/files/pubs/standardlists/labels/6840-00-577-4194_label.pdf, EPA Letter found at http://iaspub.epa.gov/apex/pesticides/f?p=PPLS:102:::NO::P102_REG_NUM:71368-1. (37 pages).
AGNIQUE® SLES 270 Sodium Lauryl, Safety Data Sheet, Dec. 7, 2017, Version 2.0, BASF Canada, Mississauga, ON, 9 pages.
OXITENO Product Brochure, no date, 16 pages.

* cited by examiner

HERBICIDAL MIXTURES

REFERENCE TO RELATED APPLICATIONS

This application claims the benefit of U.S. provisional application Ser. No. 62/609,876, filed Dec. 22, 2017, the entire disclosure of which is incorporated herein by reference.

FIELD OF THE INVENTION

The present invention generally relates to aqueous herbicidal compositions comprising a glufosinate component and an auxin herbicide component. The invention further relates to methods of preparing these compositions and methods of controlling unwanted plants using these compositions.

BACKGROUND OF THE INVENTION

To enhance the efficiency of applying herbicidal active ingredients, it is highly desirable to combine two or more active ingredients in a single formulation. Applying a combination of active ingredients with different modes of action can also provide for greater weed control. Concentrate compositions containing high loadings of multiple active ingredients are economical to transport and store. Concentrate compositions containing high loadings of multiple active ingredients (i.e., pre-mix concentrates) are also beneficial in avoiding or reducing mixing errors when preparing the application mixture in the field.

Glufosinate is known to be useful as an effective broad spectrum, non-selective post-emergence herbicide. Glufosinate is a contact herbicide and its primary mode of action is inhibition of glutamine synthetase. Typically, glufosinate is formulated as a salt, particularly the ammonium salt. One or more surfactants are also typically included in glufosinate formulations to enhance the efficacy of the herbicide.

Auxin herbicides are one class of herbicides that can supplement of the action of primary post-emergence herbicides like glufosinate. Auxin herbicides mimic or act like natural auxin plant growth regulators. Auxin herbicides appear to affect cell wall plasticity and nucleic acid metabolism, which can lead to uncontrolled cell division and growth. The injury symptoms caused by auxin herbicides include epinastic bending and twisting of stems and petioles, leaf cupping and curling, and abnormal leaf shape and venation. Off-site movement is sometimes associated with certain auxin herbicide formulations. As such, some auxin herbicide formulations include one or more additives for controlling volatility.

There remains a need for formulation strategies that provide for economic and convenient compositions that contain a combination of glufosinate and auxin herbicides along with additives such as surfactants and volatility control agents that are stable upon formulation and over varied storage conditions.

BRIEF SUMMARY OF THE INVENTION

Various aspects of the present invention relate to aqueous herbicidal concentrate compositions comprising a glufosinate component, an auxin herbicide component, a monocarboxylic acid and/or salt thereof, and a surfactant component. The surfactant component comprises at least one surfactant selected from the group consisting of an alkyl sulfates, alkyl ether sulfates, alkyl aryl ether sulfates, alkyl sulfonates, alkyl ether sulfonates, alkyl aryl ether sulfonates, alkylpolysaccharides, amidoalkylamines, alkoxylated alcohols, alkoxylated alkylamines, alkoxylated phosphate esters, and combinations thereof. The total herbicide concentration of the composition is at least about 10 wt. %, at least about 15 wt. %, at least about 20 wt. %, at least about 25 wt. %, at least about 30 wt. %, at least about 35 wt. %, at least about 40 wt. %., at least about 45 wt. %, or at least about 50 wt. %.

In other aspects, the present invention relates method of controlling the growth of unwanted plants comprising diluting the aqueous herbicidal concentrate composition with water to form an application mixture and applying an herbicidally effective amount of the application mixture to the unwanted plants.

Other objects and features will be in part apparent and in part pointed out hereinafter.

DETAILED DESCRIPTION OF THE INVENTION

Generally, the present invention relates to aqueous herbicidal compositions comprising a glufosinate component and an auxin herbicide component. For example, the present invention relates to various herbicidal concentrate compositions containing these actives. The present invention also relates to methods for controlling the growth of unwanted plants comprising diluting the herbicidal concentrate compositions with water to form an application mixture and applying an herbicidally effective amount of the application mixture to the unwanted plants.

Various aspects of the present invention provide for aqueous herbicidal concentrate compositions comprising a glufosinate component, auxin herbicide component, an additive that is useful for reducing or controlling volatility of the auxin herbicide, and a surfactant component. The herbicidal concentrate compositions described herein provide a convenient means of incorporating a glufosinate component, auxin herbicide component, and a volatility control additive into a single composition. In addition to reducing or controlling volatility, a single composition containing these ingredients can also reduce possible tank mixing errors as compared to separate compositions. Further, the storage space and associated packaging that would otherwise be required for separate compositions is reduced.

Other aspects of the present invention provide for aqueous herbicidal concentrate compositions comprising a glufosinate component, auxin herbicide component, an additive that is useful for reducing or controlling volatility of the auxin herbicide, and a surfactant component that can exhibit enhanced stability and reduced or controlled off-site movement (e.g., volatility and/or drift) of the auxin herbicide component. Agrochemical concentrates compositions may be exposed to elevated and/or below-freezing temperatures during storage and transportation. Providing stable herbicidal compositions advantageously preserves the efficacy of the herbicides over prolonged storage and varying temperature conditions.

The herbicidal compositions of the present invention include various concentrate compositions capable of containing a relatively high concentration of one or more of the herbicidal components (e.g., the glufosinate component and auxin herbicide component). For example, in some embodiments, the total herbicide concentration of the composition (e.g., the glufosinate component and auxin herbicide component) can be at least about 10 wt. %, at least about 15 wt. %, at least about 20 wt. %, at least about 25 wt. %, at least about 30 wt. %, at least about 35 wt. %, at least about 40 wt.

%., at least about 45 wt. %, or at least about 50 wt. %. In further embodiments, the total herbicide concentration of the composition is from about 10 wt. % to about 90 wt. %, from about 10 wt. % to about 80 wt. %, from about 10 wt. % to about 70 wt. %, from about 10 wt. % to about 60 wt. %, from about 10 wt. % to about 50 wt. %, from about 10 wt. % to about 40 wt. %, from about 20 wt. % to about 90 wt. %, from about 20 wt. % to about 80 wt. %, from about 20 wt. % to about 70 wt. %, from about 20 wt. % to about 60 wt. %, from about 20 wt. % to about 50 wt. %, from about 20 wt. % to about 40 wt. %, from about 30 wt. % to about 90 wt. %, from about 30 wt. % to about 80 wt. %, from about 30 wt. % to about 70 wt. %, from about 30 wt. % to about 60 wt. %, from about 30 wt. % to about 50 wt. %, from about 30 wt. % to about 40 wt. %, from about 35 wt. % to about 90 wt. %, from about 35 wt. % to about 80 wt. %, from about 35 wt. % to about 70 wt. %, from about 35 wt. % to about 60 wt. %, or from about 35 wt. % to about 50 wt. %.

Glufosinate Component

As noted, compositions of the present invention comprise a glufosinate component. Glufosinate is also referred to as phosphinothricin. Phosphinothricin has two stereoisomers (D- and L-enantiomers). L-phosphinothricin is typically the most efficacious of the stereoisomers. As used herein, the term "glufosinate" encompasses the D-, and L-enantiomers of phosphinothricin and racemic mixtures thereof.

The glufosinate component can include the acid form of glufosinate as well as various salts and/or esters thereof. Glufosinate salts generally include ammonium, alkali metal (e.g., potassium or sodium), and organic ammonium salts. The ammonium salt of glufosinate is the most common commercially available form. Thus, in various embodiments, the glufosinate component comprises the ammonium salt of glufosinate (e.g., racemic glufosinate-ammonium). Commercially available sources of glufosinate and its salts include those products sold under the trade names BASTA and LIBERTY, available from Bayer CropScience.

Various herbicidal concentrate compositions described herein provide for a high loading of the glufosinate component. For example, in various embodiments, the concentration of the glufosinate component on an acid equivalence basis is at least about 5 wt. %, at least about 10 wt. %, at least about 15 wt. %, or at least about 20 wt. %. In some embodiments, the concentration of the glufosinate component on an acid equivalence basis is from about 5 wt. % to about 50 wt. %, from about 5 wt. % to about 40 wt. %, from about 5 wt. % to about 30 wt. %, from about 5 wt. % to about 25 wt. %, from about 5 wt. % to about 20 wt. %, from about 5 wt. % to about 15 wt. %, from about 10 wt. % to about 50 wt. %, from about 10 wt. % to about 40 wt. %, from about 10 wt. % to about 30 wt. %, from about 10 wt. % to about 25 wt. %, from about 10 wt. % to about 20 wt. %, from about 10 wt. % to about 15 wt. %, from about 15 wt. % to about 50 wt. %, from about 15 wt. % to about 40 wt. %, from about 15 wt. % to about 30 wt. %, from about 15 wt. % to about 25 wt. %, from about 15 wt. % to about 20 wt. %, from about 20 wt. % to about 50 wt. %, from about 20 wt. % to about 40 wt. %, from about 20 wt. % to about 30 wt. %, or from about 20 wt. % to about 25 wt. %.

Auxin Herbicide Component

Compositions of the present invention also comprise an auxin herbicide component. Examples of auxin herbicides include benzoic acid herbicides, phenoxy herbicides, pyridine carboxylic acid herbicides, pyridine oxy herbicides, pyrimidine carboxy herbicides, quinoline carboxylic acid herbicides, and benzothiazole herbicides. Specific examples of auxin herbicides include dicamba (3,6-dichloro-2-methoxy benzoic acid); 2,4-D (2,4-dichlorophenoxyacetic acid); 2,4-DB (4-(2,4-dichlorophenoxy)butanoic acid); dichloroprop (2-(2,4-dichlorophenoxy)propanoic acid); MCPA ((4-chloro-2-methylphenoxy)acetic acid); MCPB (4-(4-chloro-2-methylphenoxy)butanoic acid); aminopyralid (4-amino-3,6-dichloro-2-pyridinecarboxylic acid); fluoroxypyr ([(4-amino-3,5-dichloro-6-fluoro-2-pyridinyl)oxy] acetic acid); triclopyr ([(3,5,6-trichloro-2-pyridinyl)oxy] acetic acid); diclopyr; mecoprop ((2-(4-chloro-2-methylphenoxy)propanoic acid); mecoprop-P; picloram (4-amino-3,5,6-trichloro-2-pyridinecarboxylic acid); quinclorac (3,7-dichloro-8-quinolinecarboxylic acid); aminocyclopyrachlor (6-amino-5-chloro-2-cyclopropyl-4-pyrimidinecarboxylic acid); benazolin; halauxifen; fluorpyrauxifen; methyl 4-amino-3-chloro-5-fluoro-6-(7-fluoro-1H-indol-6-yl)pyridine-2-carboxylate; 4-amino-3-chloro-5-fluoro-6-(7-fluoro-1H-indol-6-yl)pyridine-2-carboxylic acid; benzyl 4-amino-3-chloro-5-fluoro-6-(7-fluoro-1H-indol-6-yl)pyridine-2-carboxylate; methyl 4-amino-3-chloro-5-fluoro-6-(7-fluoro-1-isobutyryl-1H-indol-6-yl) pyridine-2-carboxylate; methyl 4-amino-3-chloro-6-[1-(2,2-dimethylpropanoyl)-7-fluoro-1H-indol-6-yl]-5-fluoropyridine-2-carboxylate; methyl 4-amino-3-chloro-5-fluoro-6-[7-fluoro-1-(methoxyacetyl)-1H-indol-6-yl] pyridine-2-carboxylate; methyl 6-(1-acetyl-7-fluoro-1H-indol-6-yl)-4-amino-3-chloro-5-fluoropyridine-2-carboxylate; potassium 4-amino-3-chloro-5-fluoro-6-(7-fluoro-1H-indol-6-yl)pyridine-2-carboxylate; and butyl 4-amino-3-chloro-5-fluoro-6-(7-fluoro-1H-indol-6-yl)pyridine-2-carboxylate; including salts and esters thereof, racemic mixtures and resolved isomers thereof; and combinations thereof.

In various embodiments, the auxin herbicide component comprises dicamba and/or a salt thereof. Examples of dicamba salts include the monoethanolamine, tetrabutylamine, dimethylamine (e.g., BANVEL, ORACLE, etc.), isopropylamine, diglycolamine (e.g., CLARITY, VANQUISH, etc.), potassium, and sodium salts, and combinations thereof. Commercially available sources of dicamba and its salts includes those products sold under the trade names BANVEL, CLARITY, DIABLO, DISTINCT, ORACLE, VANQUISH, and VISION.

In accordance with some embodiments, combinations of certain glufosinate and dicamba salts have been found to provide for herbicidal concentrate compositions exhibiting enhanced stability and other advantages such as controlled or reduced dicamba volatility. In particular, the monoethanolamine and tetrabutylamine salts of dicamba have been found to be especially suitable for providing stable concentrate compositions with ammonium glufosinate and effective in reducing dicamba volatility. Accordingly, in various embodiments, the auxin herbicide component comprises a dicamba salt selected from the group consisting of monoethanolamine, tetrabutylamine, and combinations thereof.

In some embodiments, the auxin herbicide component comprises the monoethanolamine salt of dicamba. In further embodiments, the auxin herbicide component comprises the tetrabutylamine salt of dicamba. In certain embodiments, the composition comprises both the monoethanolamine and tetrabutylamine salts of dicamba. In these embodiments, the molar ratio of the monoethanolamine salt of dicamba to the tetrabutylamine salt of dicamba can be from about 1:5 to about 5:1, from about 1:2 to about 5:1, from about 1:1 to about 5:1, from about 1:1 to about 4:1, from about 1:1 to about 3:1, or from about 1:1 to about 2:1. In some embodiments, the monoethanolamine salt of dicamba is in molar excess of the tetrabutylamine salt of dicamba (e.g., about 65:35).

In various embodiments, the auxin herbicide component comprises 2,4-D and/or a salt thereof. Examples of 2,4-D salts include the choline, dimethylamine, and isopropylamine salts, and combinations thereof. Commercially available sources of 2,4-D and its salts include those products sold under trade names BARRAGE, FORMULA 40, OPTAMINE, and WEEDAR 64.

Other agronomically acceptable salts of auxin herbicides include polyamine salts such as those described in U.S. Patent Application Publication No. 2012/0184434, which is incorporated herein by reference. The polyamines described in U.S. 2012/0184434 include those of formula (A)

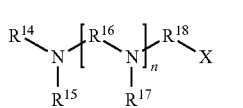

(A)

wherein $R^{14}$, $R^{15}$, $R^{17}$, $R^{19}$ and $R^{20}$ are independently H or $C_1$-$C_6$-alkyl, which is optionally substituted with OH, $R^{16}$ and $R^{18}$ are independently $C_2$-$C_4$-alkylene, X is OH or $NR^{19}R^{20}$, and n is from 1 to 20; and those of formula (B)

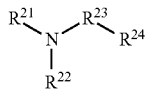

(B)

wherein $R^{21}$ and $R^{22}$ are independently H or $C_1$-$C_6$-alkyl, $R^{23}$ is $C_1$-$C_{12}$-alkylene, and $R^{24}$ is an aliphatic $C_5$-$C_8$ ring system, which comprises either nitrogen in the ring or which is substituted with at least one unit $NR^{21}R^{22}$. Specific examples of these polyamines include tetraethylenepentamine, triethylenetetramine, diethylenetriamine, pentamethyldiethylenetriamine, N,N,N',N'',N''-pentamethyl-dipropylenetriamine, N,N-bis(3-dimethylaminopropyl)-N-isopropanolamine, N'-(3-(dimethylamino)propyl)-N,N-dimethyl-1,3-propanediamine, N,N-bis(3-aminopropyl)methylamine, N-(3-dimethylaminopropyl)-N,N-diisopropanolamine, N,N,N'-trimethylaminoethylethanolamine, aminopropylmonomethylethanolamine, and aminoethylethanolamine, and mixtures thereof.

Various herbicidal concentrate compositions described herein provide for a high loading of the auxin herbicide component. For example, in various embodiments, the concentration of the auxin herbicide component on an acid equivalence basis is at least about 5 wt. %, at least about 10 wt. %, at least about 15 wt. %, or at least about 20 wt. %. In some embodiments, the concentration of the auxin herbicide component on an acid equivalence basis is from about 5 wt. % to about 50 wt. %, from about 5 wt. % to about 40 wt. %, from about 5 wt. % to about 30 wt. %, from about 5 wt. % to about 25 wt. %, from about 5 wt. % to about 20 wt. %, from about 5 wt. % to about 15 wt. %, from about 10 wt. % to about 50 wt. %, from about 10 wt. % to about 40 wt. %, from about 10 wt. % to about 30 wt. %, from about 10 wt. % to about 25 wt. %, from about 10 wt. % to about 20 wt. %, from about 10 wt. % to about 15 wt. %, from about 15 wt. % to about 50 wt. %, from about 15 wt. % to about 40 wt. %, from about 15 wt. % to about 30 wt. %, from about 15 wt. % to about 25 wt. %, from about 15 wt. % to about 20 wt. %, from about 20 wt. % to about 50 wt. %, from about 20 wt. % to about 40 wt. %, from about 20 wt. % to about 30 wt. %, or from about 20 wt. % to about 25 wt. %.

In some embodiments, the concentration (wt. %) of the glufosinate component is greater than the concentration of the auxin herbicide component on an acid equivalence basis. In other embodiments, the concentration of the auxin herbicide component is greater than the concentration of the glufosinate component on an acid equivalence basis. In various embodiments, the acid equivalence weight ratio of the glufosinate component to the auxin herbicide component is at least about 1:10, at least about 1:5, at least about 1:3, at least about 1:2, at least about 1:1, at least about 2:1, at least about 3:1, at least about 5:1, or at least about 10:1. In some embodiments, the acid equivalence weight ratio of the glufosinate component to the auxin herbicide component is from about 1:5 to about 5:1, from about 1:5 to about 4:1, from about 1:5 to about 3:1, from about 1:5 to about 2:1, from about 1:5 to about 1:1, from about 1:4 to about 5:1, from about 1:4 to about 4:1, from about 1:4 to about 3:1, from about 1:4 to about 2:1, from about 1:4 to about 1:1, from about 1:3 to about 5:1, from about 1:3 to about 4:1, from about 1:3 to about 3:1, from about 1:3 to about 2:1, from about 1:3 to about 1:1, from about 1:2 to about 5:1, from about 1:2 to about 4:1, from about 1:2 to about 3:1, from about 1:2 to about 2:1, from about 1:2 to about 1:1, from about 1:1 to about 5:1, from about 1:1 to about 4:1, from about 1:1 to about 3:1, from about 1:1 to about 2:1, from about 1:1.5 to about 1.5:1, or from about 1:1.25 to about 1.25:1.

Monocarboxylic Acid and/or Salt Thereof

The herbicidal compositions described herein further comprise an additive to control or reduce potential herbicide volatility. Under some application conditions, certain auxin herbicides, can vaporize into the surrounding atmosphere and migrate from the application site to adjacent crop plants, such as soybean and cotton, where contact damage to sensitive plants can occur. For example, as described in U.S. Application Publication Nos. 2014/0128264 and 2015/0264924, which are incorporated herein by reference, additives to control or reduce potential herbicide volatility include monocarboxylic acids and/or salts thereof.

"Monocarboxylic acid" refers to a hydrocarbon or substituted hydrocarbon containing only one carboxy functional group (i.e., $R^1$—C(O)OH). The salt of a monocarboxylic acid (i.e., a monocarboxylate) refers to the general structure $R^1$—C(O)OM wherein M is an agriculturally acceptable cation. In various embodiments, the composition comprises at least one salt of a monocarboxylic acid, which in aqueous compositions may be present, in whole or in part, in dissociated form as a monocarboxylate anion and the corresponding cation.

Representative monocarboxylic acids and salts thereof generally comprise a hydrocarbon or unsubstituted hydrocarbon selected from, for example, unsubstituted or substituted, straight or branched chain alkyl (e.g., $C_1$-$C_{20}$ alkyl such as methyl, ethyl, n-propyl, isopropyl, etc.); unsubstituted or substituted, straight or branched chain alkenyl (e.g., $C_2$-$C_{20}$ alkyl such as ethenyl, n-propenyl, isopropenyl, etc.); unsubstituted or substituted aryl (e.g., phenyl, hydroxyphenyl, etc.); or unsubstituted or substituted arylalkyl (e.g., benzyl). In particular, the monocarboxylic acid can be selected from the group consisting of formic acid, acetic acid, propionic acid, and benzoic acid. The salt of the monocarboxylic acid can be selected from the group consisting of formate salts, acetate salts, propionate salts, and benzoate salts. The salt of the monocarboxylic acid can include, for example, alkali metal salts selected from sodium and potassium. Some preferred salts of the monocarboxylic acid include sodium acetate and potassium acetate.

In various embodiments, the concentration of the monocarboxylic acid and/or salt thereof is at least about 3 wt. %, at least about 5 wt. %, at least about 10 wt. %, at least about 12.5 wt. %, or at least about 15 wt. %. For example, the concentration of the monocarboxylic acid and/or salt thereof can be from about 3 wt. % to about 30 wt. %, from about 3 wt. % to about 25 wt. %, from about 3 wt. % to about 20 wt. %, from about 4 wt. % to about 20 wt. %, from about 5 wt. % to about 20 wt. %, from about 7 wt. % to about 20 wt. %, from about 8 wt. % to about 20 wt. %, from about 9 wt. % to about 20 wt. %, from about 10 wt. % to about 20 wt. %, or from about 10 wt. % to about 15 wt. %.

In some embodiments, the acid equivalent molar ratio of the monocarboxylic acid and/or salt thereof to the auxin herbicide component is at least about 1:10, at least about 1:5, at least about 1:3, at least about 1:2, at least about 1:1, at least about 2:1, at least about 3:1, at least about 4:1, at least about 5:1, at least about 6:1, at least about 8:1, or at least about 10:1. For example, the acid equivalent molar ratio of the monocarboxylic acid and/or salt thereof to the auxin herbicide component can be from about 10:1 to about 1:10, from about 10:1 to about 1:5, from about 5:1 to about 1:5, from about 3:1 to about 1:3, from about 2:1 to about 1:2, from about 1:1 to about 10:1, from about 1:1 to about 8:1, from about 1:1 to about 6:1, from about 1:1 to about 5:1, from about 1:1 to about 4:1, from about 1:1 to about 3:1, or from about 1:1 to about 2:1.

Surfactant Component

Typically, the compositions of the present invention comprise a surfactant component. It has been found that certain surfactants provide for herbicidal concentrate compositions exhibiting enhanced stability. In various embodiments, the surfactant component comprises at least one surfactant selected from the group consisting of alkyl sulfates, alkyl ether sulfates, alkyl aryl ether sulfates, alkyl sulfonates, alkyl ether sulfonates, alkyl aryl ether sulfonates, alkylpolysaccharides, amidoalkylamines, alkoxylated alcohols, alkoxylated alkylamines, alkoxylated phosphate esters, and combinations thereof. For example, the surfactant component can comprise two or more surfactants. In various embodiments, the concentration of the surfactant component is at least about 1 wt. %, at least about 2 wt. %, at least about 3 wt. %, at least about 4 wt. %, at least about 5 wt. %, at least about 6 wt. %, at least about 7 wt. %, at least about 8 wt. %, at least about 9 wt. %, at least about 10 wt. %, at least about 12 wt. %, at least about 15 wt. %, or at least about 20 wt. %. In some embodiments, the concentration of the surfactant component can be from about 1 wt. % to about 25 wt. %, from about 2 wt. % to about 25 wt. %, from about 3 wt. % to about 25 wt. %, from about 4 wt. % to about 25 wt. %, from about 5 wt. % to about 25 wt. %, from about 5 wt. % to about 20 wt. %, from about 10 wt. % to about 20 wt. %, from about 15 wt. % to about 20 wt. %, or from about 10 wt. % to about 15 wt. %.

Sulfate Surfactants

In various embodiments, the surfactant component comprises one or more alkyl sulfates, alkyl ether sulfates, and/or alkyl aryl ether sulfates. Examples of these surfactants include compounds of Formulas (1a), (1b), and (1c):

Formula (1a)

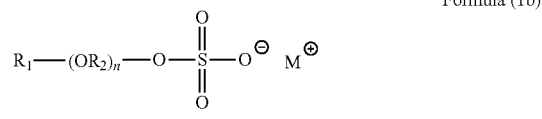

Formula (1b)

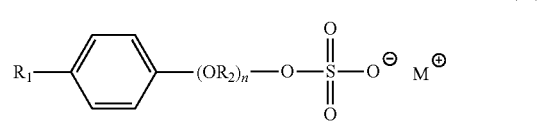

Formula (1c)

wherein compounds of Formula (1a) are alkyl sulfates, compounds of Formula (1b) are alkyl ether sulfates, and compounds of Formula (1c) are alkyl aryl ether sulfates.

In Formulas (1a), (1b), and (1c), $R_1$ is a hydrocarbyl or substituted hydrocarbyl having from about 4 to about 22 carbon atoms, and M is selected from an alkali metal cation, ammonium, an ammonium compound, or $H^+$. In Formulas (1b) and (1c), each $R_2$ in each of the ($R_2$O) groups is independently selected from $C_1$-$C_4$ alkylene (e.g., n-propylene and/or ethylene), and n is from 1 to about 20. Examples of alkyl sulfates include sodium $C_{8-10}$ sulfate, sodium $C_{10-16}$ sulfate, sodium lauryl sulfate, sodium $C_{14-16}$ sulfate, diethanolamine lauryl sulfate, triethanolamine lauryl sulfate and ammonium lauryl sulfate. Examples of alkyl ether sulfates include sodium $C_{12-15}$ pareth sulfate (1 EO), ammonium $C_{6-10}$ alcohol ether sulfate, sodium $C_{6-10}$ alcohol ether sulfate, isopropylammonium $C_{6-10}$ alcohol ether sulfate, ammonium $C_{10-12}$ alcohol ether sulfate, sodium lauryl ether sulfate,. Examples of alkyl aryl ether sulfates include sodium nonylphenol ethoxylate sulfates. Specific examples of sulfate surfactants include AGNIQUE SLES-270 ($C_{10-16}$, 1-2.5 EO, sodium lauryl ether sulfate), WITCOLATE 1247H ($C_{6-10}$, 3EO, ammonium sulfate), WITCOLATE 7093 ($C_{6-10}$, 3EO, sodium sulfate), WITCOLATE 7259 ($C_{8-10}$ sodium sulfate), WITCOLATE 1276 ($C_{10-12}$, 5EO, ammonium sulfate), WITCOLATE LES-60A ($C_{12-14}$, 3EO, ammonium sulfate), WITCOLATE LES-60C ($C_{12-14}$, 3EO, sodium sulfate), WITCOLATE 1050 ($C_{12-15}$, 10EO, sodium sulfate), WITCOLATE WAQ ($C_{12-16}$ sodium sulfate), WITCOLATE D-51-51 (nonylphenol 4EO, sodium sulfate) and WITCOLATE D-51-53 (nonylphenol 10EO, sodium sulfate).

Alkylpolysaccharide Surfactants

In some embodiments, the surfactant component comprises one or more alkylpolysaccharide surfactants. Examples of alkylpolysaccharide surfactants include compounds of Formula (2):

$R^{11}$—O-(sug)$_u$    Formula (2)

wherein $R^{11}$ is a straight or branched chain substituted or unsubstituted hydrocarbyl selected from alkyl, alkenyl, alkylphenyl, alkenylphenyl having from about 4 to about 22 carbon atoms for from about 4 to 18 carbon atoms. The sug moiety is a saccharide residue, and may be an open or cyclic (i.e., pyranose) structure. The saccharide may be a monosaccharide having 5 or 6 carbon atoms, a disaccharide, an oligosaccharide or a polysaccharide. Examples of suitable saccharide moieties, including their corresponding pyranose form, include ribose, xylose, arabinose, glucose, galactose, mannose, telose, gulose, allose, altrose, idose, lyxose, ribulose, sorbose (sorbitan), fructose, and mixtures thereof. Examples of suitable disaccharides include maltose, lactose and sucrose. Disaccharides, oligosaccharides and polysaccharides can be a combination of two or more identical saccharides, for example maltose (two glucoses) or two or more different saccharides, for example sucrose (a combination of glucose and fructose). The degree of polymerization, u, is an average number from 1 to about 10, from 1 to about 8, from 1 to about 5, from 1 to about 3, and from 1 to about 2. In various embodiments, the alkylpolysaccharide surfactant may be an alkylpolyglucoside (APG) surfactant of formula (2) wherein: $R^{11}$ is a branched or straight chain alkyl group preferably having from 4 to 22 carbon atoms or from 8 to 18 carbon atoms, or a mixture of alkyl groups having an average value within the given range; sug is a glucose residue (e.g., a glucoside); and u is from 1 to about 5, and more preferably from 1 to about 3. In various embodiments, the surfactant component comprises an APG of formula (2) wherein $R^{11}$ is a branched or straight chain alkyl group having from 8 to 10 carbon atoms or a mixture of alkyl groups having an average value within the given range and u is from 1 to about 3.

Examples of alkylpolysaccharide surfactant are known in the art. Some preferred alkylpolysaccharide surfactants include AGNIQUE PG8107-G (AGRIMUL PG 2067) available from BASF and AL-2559 ($C_{9-11}$ alkylpolysaccharide) available from Croda. Representative surfactants are also presented in the table below wherein for each surfactant sug is a glucose residue.

Commercial Alkylpolysaccharide Surfactants

| Trade name | $R^{11}$ | u |
|---|---|---|
| APG 225 | $C_{8-12}$ alkyl | 1.7 |
| APG 325 | $C_{9-11}$ alkyl | 1.5 |
| APG 425 | $C_{8-16}$ alkyl | 1.6 |
| APG 625 | $C_{12-16}$ alkyl | 1.6 |
| GLUCOPON 600 | $C_{12-16}$ alkyl | 1.4 |
| PLANTAREN 600 | $C_{12-14}$ alkyl | 1.3 |
| PLANTAREN 1200 | $C_{12-16}$ alkyl | 1.4 |
| PLANTAREN 1300 | $C_{12-16}$ alkyl | 1.6 |
| PLANTAREN 2000 | $C_{8-16}$ alkyl | 1.4 |
| Agrimul PG 2076 | $C_{8-10}$ alkyl | 1.5 |
| Agrimul PG 2067 | $C_{8-10}$ alkyl | 1.7 |
| Agrimul PG 2072 | $C_{8-16}$ alkyl | 1.6 |
| Agrimul PG 2069 | $C_{9-11}$ alkyl | 1.6 |
| Agrimul PG 2062 | $C_{12-16}$ alkyl | 1.4 |
| Agrimul PG 2065 | $C_{12-16}$ alkyl | 1.6 |
| BEROL AG6202 | 2-ethyl-1-hexyl | |

Amidoalkylamine Surfactants

The surfactant component can comprise one or more amidoalkylamine surfactants. Examples of amidoalkylamine surfactants include compounds of Formula (3):

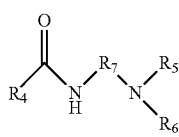

Formula (3)

wherein $R_4$ is a hydrocarbyl or substituted hydrocarbyl having from 1 to about 22 carbon atoms, $R_5$ and $R_6$ are each independently hydrocarbyl or substituted hydrocarbyl having from 1 to about 6 carbon atoms and $R_7$ is hydrocarbylene or substituted hydrocarbylene having from 1 to about 6 carbon atoms.

$R_4$ is preferably an alkyl or substituted alkyl having an average value of carbon atoms between about 4 to about 20 carbon atoms, preferably an average value between about 4 and about 18 carbon atoms, more preferably an average value from about 4 to about 12 carbon atoms, more preferably an average value from about 5 to about 12 carbon atoms, even more preferably an average value from about 6 to about 12 carbon atoms, and still more preferably an average value from about 6 to about 10 carbon atoms. The $R_4$ alkyl group may be derived from a variety of sources that provide alkyl groups having from about 4 to about 18 carbon atoms, for example, the source may be butyric acid, valeric acid, caprylic acid, capric acid, coco (comprising mainly lauric acid), myristic acid (from, e.g., palm oil), soy (comprising mainly linoleic acid, oleic acid, and palmitic acid), or tallow (comprising mainly palmitic acid, oleic acid, and stearic acid). In some embodiments, the amidoalkylamine surfactant component may comprise a blend of amidoalkylamines having alkyl chains of various lengths from about 5 carbon atoms to about 12 carbon atoms. For example, depending upon the source of the $R_4$ alkyl group, an amidoalkylamine surfactant component may comprise a blend of surfactants having $R_4$ groups that are 5 carbon atoms in length, 6 carbon atoms in length, 7 carbon atoms in length, 8 carbon atoms in length, 9 carbon atoms in length, 10 carbon atoms in length, 11 carbon atoms in length, and 12 carbon atoms in length, longer carbon chains, and combinations thereof. In other embodiments, the amidoalkylamine surfactant component may comprise a blend of surfactants having $R_4$ groups that are 5 carbon atoms in length, 6 carbon atoms in length, 7 carbon atoms in length, and 8 carbon atoms in length. In some embodiments, the amidoalkylamine surfactant component may comprise a blend of surfactants having $R_1$ groups that are 6 carbon atoms in length, 7 carbon atoms in length, 8 carbon atoms in length, 9 carbon atoms in length, and 10 carbon atoms in length. In other embodiments, the amidoalkylamine surfactant component may comprise a blend of surfactants having $R_4$ groups that are 8 carbon atoms in length, 9 carbon atoms in length, 10 carbon atoms in length, 11 carbon atoms in length, and 12 carbon atoms in length.

$R_5$ and $R_6$ are independently preferably an alkyl or substituted alkyl having from 1 to about 4 carbon atoms. $R_5$ and $R_6$ are most preferably independently an alkyl having from 1 to about 4 carbon atoms, and most preferably methyl. $R_7$ is preferably an alkylene or substituted alkylene having from 1 to about 4 carbon atoms. $R_7$ is most preferably an alkylene having from 1 to about 4 carbon atoms, and most preferably n-propylene.

In various amidoalkylamine surfactants, $R_4$ is $C_{6-10}$, i.e., an alkyl group having 6 carbon atoms, 7 carbon atoms, 8 carbon atoms, 9 carbon atoms, 10 carbon atoms, or a blend of any of these, i.e., from about 6 carbon atoms to about 10 carbon atoms; $R_5$ and $R_6$ are each methyl; and $R_7$ is n-propylene (i.e., $C_{6-10}$ amidopropyl dimethylamine). One preferred amidoalkylamine surfactants is ADSEE C80W (coco amidopropyl dimethylamine), which is available from Akzo Nobel.

Alkoxylated Alcohol Surfactants

In some embodiments, the surfactant component comprises an alkoxylated alcohol surfactant. Examples of alkoxylated alcohol surfactants include compounds of Formula (4):

$$R_8-O-(R_9O)_nH \qquad \text{Formula (4)}$$

wherein $R_8$ is a straight or branched chain hydrocarbyl having fan average of from about 4 to about 22 carbon atoms; each $R_9$ in each of the ($R_9O$) groups is independently selected from $C_1$-$C_4$ alkylene (e.g., n-propylene and/or ethylene); and n is an average value of from about 2 to about 50.

$R_8$ is preferably an alkyl group having from about 4 to about 22 carbon atoms, more preferably from about 8 to about 18 carbon atoms, and still more preferably from about 12 to about 18 carbons atoms. $R_8$ may be branched or straight. Preferably, $R_8$ is straight. The $R_8$ alkyl group may be derived from a variety of sources that provide alkyl groups having from about 4 to about 22 carbon atoms, for example, the source may be butyric acid, valeric acid, caprylic acid, capric acid, coco (comprising mainly lauric acid), myristic acid (from, e.g., palm oil), soy (comprising mainly linoleic acid, oleic acid, and palmitic acid), or tallow (comprising mainly palmitic acid, oleic acid, and stearic acid). Sources of the $R_8$ group include, for example, coco or tallow, or $R_8$ may be derived from synthetic hydrocarbyls, such as decyl, dodedecyl, tridecyl, tetradecyl, hexadecyl, or octadecyl groups. The $R_8$ alkyl chain in a population of alkoxylated alcohol co-surfactants typically comprises alkyl chains having varying length, for example, from 12 to 16 carbons in length, or from 16 to 18 carbons in length, on average. Most preferably, the $R_8$ alkyl chain comprises predominantly 12 to 16 carbon atoms. $R_9$ is preferably ethylene. The value of n is preferably an average between about 2 and about 30, more preferably between about 2 and about 20, even more preferably between about 2 and about 10.

Specific alkoxylated alcohol surfactants for use in the herbicidal compositions of the present invention include, for example, ETHYLANS, such as ETHYLAN 1005, ETHYLAN 1008, and ETHYLAN 6830 available from Akzo Nobel; BEROLS, such as BEROL 048, BEROL 050, BEROL 175, BEROL 185, BEROL 260, BEROL 266, and BEROL 84, among others, also available from Akzo Nobel; BRIJ 30, 35, 76, 78, 92, 97 or 98 available from ICI Surfactants; TERGITOL 15-S-3, 15-S-5, 15-S-7, 15-S-9, 15-S-12, 15-5-15 or 15-S-20 available from Union Carbide; SURFONIC L24-7, L12-8, L-5, L-9, LF-17 or LF-42 available from Huntsman, and SYNPERONIC 91/6 available from Croda.

Sulfonate Surfactants

In various embodiments, the surfactant component comprises one or more alkyl sulfonates, alkyl ether sulfonates, and/or alkyl aryl ether sulfonates. Examples of sulfonate surfactants include compounds of Formulas (5a), (5b), and (5c):

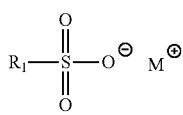

Formula (5a)

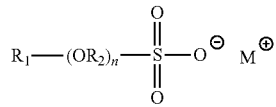

Formula (5b)

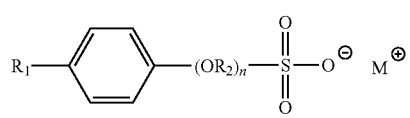

Formula (5c)

wherein compounds of Formula (5a) are alkyl sulfonates, compounds of Formula (5b) are alkyl ether sulfonates, and compounds of Formula (5c) are alkyl aryl ether sulfonates.

In Formulas (5a), (5b), and (5c), $R_1$ is a hydrocarbyl or substituted hydrocarbyl having from about 4 to about 22 carbon atoms, and M is selected from an alkali metal cation, ammonium, an ammonium compound, or $H^+$. In Formulas (5b), and (5c), each $R_2$ in each of the ($R_2O$) groups is independently selected from $C_1$-$C_4$ alkylene (e.g., n-propylene and/or ethylene), and n is from 1 to about 20. Examples of sulfonate surfactants include, for example, WITCONATE 93S (isopropylamine of dodecylbenzene sulfonate), WITCONATE NAS-8 (octyl sulfonic acid, sodium salt), WITCONATE AOS (tetradecyl/hexadecyl sulfonic acid, sodium salt), WITCONATE 60T (linear dodecylbenzene sulfonic acid, triethanolamine salt) and WITCONATE 605a (branched dodecylbenzene sulfonic acid, N-butylamine salt).

Alkoxylated Alkylamine Surfactants

In some embodiments, the surfactant component comprises an alkoxylated alkylamine. Examples of alkoxylated alkylamine surfactants include compounds of Formula (6):

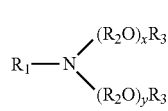

Formula (6)

wherein $R_1$ is a straight or branched chain hydrocarbyl having an average of from about 5 to about 22 carbon atoms, preferably from about 12 to about 18 carbon atoms, more preferably a mixture of straight or branched chain hydrocarbyl groups having from about 14 to about 18 carbon atoms, still more preferably a mixture of straight or branched chain hydrocarbyl groups having from about 16 to about 18 carbon atoms (tallow), each $R_2$ in each of the ($R_2O$) groups is $C_1$-$C_4$ alkylene, more preferably $C_2$ alkylene, each $R_3$ is independently hydrogen or $C_1$-$C_4$ alkyl, preferably hydrogen, and, in some embodiments, x and y are average numbers such that the sum of x and y is from about 3 to about 30, more preferably from about 5 to about 20, more preferably from about 8 to about 20, more preferably from 8 to about 15, and still more preferably from about 9 to about 10. In other embodiments, x and y are average numbers such that the sum of x and y is greater than 5, such as in the range of from 6 to about 15, from 6 to about 12, or from 6 to about 10. Examples of suitable surfactants include, without restriction, BEROL 300 (cocoamine 5EO), BEROL 381 (tallowamine 15EO), BEROL 391 (tallowamine 5EO), BEROL 397 (cocoamine 15 EO), BEROL 398 (cocoamine 11 EO), BEROL 498 (tallowamine 10 EO), ETHOMEEN C/15 (cocoamine 5EO), ETHOMEEN C/25 (cocoamine 15 EO), ETHOMEEN T/15 (tallowamine 5EO), ETHOMEEN T/20

(tallowamine 10EO), ETHOMEEN T/19 (tallowamine 9EO), ETHOMEEN T/25 (tallowamine 15 EO), WITCAMINE TAM-105 (tallowamine 10 EO), WITCAMINE TAM-80 (tallowamine 8 EO), WITCAMINE TAM-60 (tallowamine 6EO), all available from Akzo Nobel.

Alkoxylated Phosphate Esters Surfactants

In various embodiments, the surfactant component comprises a phosphate ester of an alkoxylated tertiary amine. In some embodiments, the alkoxylated phosphate ester is selected from the group consisting of a phosphate ester of an alkoxylated tertiary amine, phosphate ester of an alkoxylated etheramine, phosphate ester of an alkoxylated alcohol, and a combination thereof. Examples of phosphate esters of alkoxylated tertiary amines include compounds of Formulas (7a) and (7b):

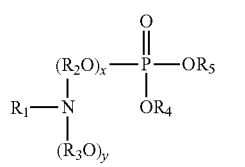

Formula (7a)

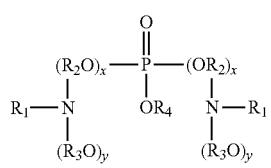

Formula (7b)

wherein each $R_1$ is independently a straight or branched chain hydrocarbyl having an average of from about 4 to about 22 carbon atoms, each $R_2$ in each of the ($R_2O$) groups and $R_3$ in each of the ($R_3O$) groups are each independently selected from $C_1$-$C_4$ alkylene, the sum of x and y are average numbers such that the sum of each x and y group is from about 2 to about 60, and $R_4$ and $R_5$ are each independently hydrogen or a straight or branched chain hydrocarbyl or substituted hydrocarbyl having from 1 to about 6 carbon atoms.

Each $R_1$ is preferably independently an alkyl having from about 4 to about 22 carbon atoms, more preferably from about 8 to about 18 carbon atoms, and still more preferably from about 12 to about 18 carbons atoms, for example coco or tallow. $R_1$ is most preferably tallow. Each $R_2$ and $R_3$ is preferably ethylene. The sum of each x and y group is preferably independently an average value ranging from about 2 to about 22, more preferably between about 10 and about 20, for example, about 15. More preferably $R_4$ and $R_5$ are each independently hydrogen or a linear or branched chain alkyl having from 1 to about 6 carbon atoms. $R_4$ and $R_5$ are preferably hydrogen.

Specific phosphate esters of alkoxylated tertiary amine surfactants for use in the herbicidal composition of the present invention are described in U.S. Application Publication No. 2002/0160918, by Lewis et al. (Huntsman Petrochemical Corporation), such as phosphate esters of tallow amine ethoxylates, including phosphate esters of SURFONIC T5, phosphate esters of SURFONIC T15, phosphate esters of SURFONIC T20, and mixtures thereof, all available from Huntsman International LLC.

Examples of phosphate esters of alkoxylated etheramines include compounds of Formulas (8a) and (8b):

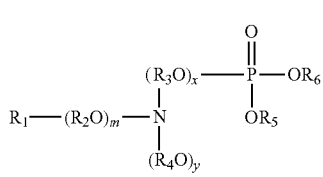

Formula (8a)

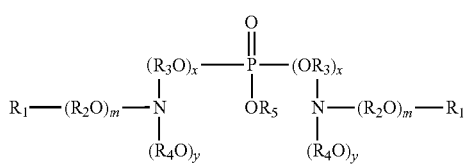

Formula (8b)

wherein each $R_1$ is independently a straight or branched chain hydrocarbyl having an average of from about 4 to about 22 carbon atoms; $R_2$ in each of the ($R_2O$) groups, $R_3$ in each of the ($R_3O$) groups, and $R_4$ in each of the ($R_4O$) groups are independently selected from $C_1$-$C_4$ alkylene; each m is independently an average number from about 1 to about 10; x and y are average numbers such that the sum of each x and y group is from about 2 to about 60; and each $R_5$ and $R_6$ are independently hydrogen or a straight or branched chain alkyl having from 1 to about 6 carbon atoms.

Each $R_1$ is preferably independently an alkyl having from about 4 to about 22 carbon atoms, more preferably from about 8 to about 18 carbon atoms, from about 10 to about 16 carbon atoms, from about 12 to about 18 carbons atoms, or from about 12 to about 14 carbon atoms. Sources of the $R_1$ group include, for example, coco or tallow, or $R_1$ may be derived from synthetic hydrocarbyls, such as decyl, dodedecyl, tridecyl, tetradecyl, hexadecyl, or octadecyl groups. Each $R_2$ may independently be propylene, isopropylene, or ethylene, and each m is preferably independently from about 1 to 5, such as 2 to 3. Each $R_3$ and $R_4$ may independently be ethylene, propylene, isopropylene, and are preferably ethylene. The sum of each x and y group is preferably independently an average value ranging from about 2 to about 22, such as from about 2 to 10, or about 2 to 5. In some embodiments, the sum of each x and y group is preferably independently between about 10 and about 20, for example, about 15. More preferably $R_5$ and $R_6$ are each independently hydrogen or a linear or branched chain alkyl having from 1 to about 6 carbon atoms. $R_5$ and $R_6$ are preferably hydrogen.

Examples of phosphate esters of alkoxylated alcohols include compounds of Formulas (9a) and (9b):

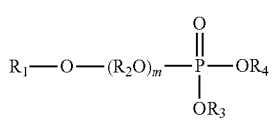

Formula (9a)

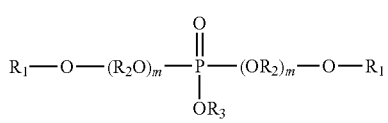

Formula (9b)

wherein each $R_1$ is independently a straight or branched chain hydrocarbyl having from about 4 to about 22 carbon atoms; $R_2$ in each of the ($R_2O$) groups is independently selected from $C_1$-$C_4$ alkylene; each m is independently an average number from about 1 to about 60; and $R_3$ and $R_4$ are each independently hydrogen or a straight or branched chain alkyl having from 1 to about 6 carbon atoms.

Each $R_1$ is preferably independently an alkyl having from about 4 to about 22 carbon atoms, more preferably from about 8 to about 20 carbon atoms, or an alkylphenyl having from about 4 to about 22 carbon atoms, more preferably from about 8 to about 20 carbon atoms. Sources of the $R_1$ group include, for example, coco or tallow, or $R_1$ may be derived from synthetic hydrocarbyls, such as decyl, dodedecyl, tridecyl, tetradecyl, hexadecyl, or octadecyl groups. Each $R_2$ may independently be propylene, isopropylene, or ethylene, and is preferably ethylene. Each m is preferably independently from about 9 to about 15. More preferably $R_3$ and $R_4$ are each independently hydrogen or a linear or branched chain alkyl having from 1 to about 6 carbon atoms. $R_4$ and $R_5$ are preferably hydrogen.

Specific phosphate esters of alkoxylated alcohol surfactants for use in the herbicidal composition of the present invention include, for example, EMPHOS CS-121, EMPHOS PS-400, and WITCONATE D-51-29, available from Akzo Nobel.

Additional Herbicide Ingredients

The herbicidal compositions of the present invention can further comprise an additional herbicide (i.e., in addition to the glufosinate component and auxin herbicide component). Additional herbicides include acetyl CoA carboxylase (ACCase) inhibitors, enolpyruvyl shikimate-3-phosphate synthase (EPSPS) inhibitors, photosystem I (PS I) inhibitors, photosystem II (PS II) inhibitors, acetolactate synthase (ALS) or acetohydroxy acid synthase (AHAS) inhibitors, mitosis inhibitors, protoporphyrinogen oxidase (PPO) inhibitors, hydroxyphenylpyruvate dioxygenase (HPPD) inhibitors, cellulose inhibitors, oxidative phosphorylation uncouplers, dihydropteroate synthase inhibitors, fatty acid and lipid biosynthesis inhibitors, auxin transport inhibitors, salts and esters thereof, racemic mixtures and resolved isomers thereof, and mixtures thereof. Examples of herbicides within these classes are provided below. Where an herbicide is referenced generically herein by name, unless otherwise restricted, that herbicide includes all commercially available forms known in the art such as salts, esters, free acids and free bases, as well as stereoisomers thereof. For example, where the herbicide name "glyphosate" is used, glyphosate acid, salts and esters are within the scope thereof.

In various embodiments, the additional herbicide comprises an EPSPS herbicide such as glyphosate or a salt or ester thereof.

In still further embodiments, the additional herbicide comprises a PPO inhibitor. PPO inhibitors include, for example, acifluorfen, azafenidin, bifenox, butafenacil, carfentrazone-ethyl, flufenpyr-ethyl, flumiclorac, flumiclorac-pentyl, flumioxazin, fluoroglycofen, fluthiacet-methyl, fomesafen, lactofen, oxadiargyl, oxadiazon, oxyfluorfen, pyraflufen-ethyl, saflufenacil and sulfentrazone, salts and esters thereof, and mixtures thereof. In particular embodiments, the additional herbicide comprises fomesafen and/or a salt of fomesafen such as sodium fomesafen.

In various embodiments, the additional herbicide comprises a HPPD inhibitor. HPPD inhibitors include, for example, aclonifen, amitrole, beflubutamid, benzofenap, clomazone, diflufenican, fluridone, flurochloridone, flurtamone, isoxachlortole, isoxaflutole, mesotrione, norflurazon, picolinafen, pyrazolynate, pyrazoxyfen, sulcotrione, tembotrione and topramezone, salts and esters thereof, and mixtures thereof.

In some embodiments, the additional herbicide comprises a PS II inhibitor. PS II inhibitors include, for example, ametryn, amicarbazone, atrazine, bentazon, bromacil, bromoxynil, chlorotoluron, cyanazine, desmedipham, desmetryn, dimefuron, diuron, fluometuron, hexazinone, ioxynil, isoproturon, linuron, metamitron, methibenzuron, metoxuron, metribuzin, monolinuron, phenmedipham, prometon, prometryn, propanil, pyrazon, pyridate, siduron, simazine, simetryn, tebuthiuron, terbacil, terbumeton, terbuthylazine and trietazine, salts and esters thereof, and mixtures thereof.

In certain embodiments, the additional herbicide comprises an ACCase inhibitor. ACCase inhibitors include, for example, alloxydim, butroxydim, clethodim, cycloxydim, pinoxaden, sethoxydim, tepraloxydim and tralkoxydim, salts and esters thereof, and mixtures thereof. Another group of ACCase inhibitors include chlorazifop, clodinafop, clofop, cyhalofop, diclofop, diclofop-methyl, fenoxaprop, fenthiaprop, fluazifop, haloxyfop, isoxapyrifop, metamifop, propaquizafop, quizalofop and trifop, salts and esters thereof, and mixtures thereof. ACCase inhibitors also include mixtures of one or more "dims" and one or more "fops", salts and esters thereof.

In various embodiments, the additional herbicide comprises an ALS or AHAS inhibitor. ALS and AHAS inhibitors include, for example, amidosulfuron, azimsulfruon, bensulfuron-methyl, bispyribac-sodium, chlorimuron-ethyl, chlorsulfuron, cinosulfuron, cloransulam-methyl, cyclosulfamuron, diclosulam, ethametsulfuron-methyl, ethoxysulfuron, flazasulfuron, florazulam, flucarbazone, flucetosulfuron, flumetsulam, flupyrsulfuron-methyl, foramsulfuron, halo sulfuron-methyl, imazamethabenz, imazamox, imazapic, imazapyr, imazaquin, imazethapyr, imazosulfuron, iodosulfuron, metsulfuron-methyl, nicosulfuron, penoxsulam, primisulfuron-methyl, propoxycarbazone-sodium, prosulfuron, pyrazosulfuron-ethyl, pyribenzoxim, pyrithiobac, rimsulfuron, sulfometuron-methyl, sulfosulfuron, thiencarbazone, thifensulfuron-methyl, triasulfuron, tribenuron-methyl, trifloxysulfuron and triflusulfuron-methyl, salts and esters thereof, and mixtures thereof.

In further embodiments, the additional herbicide comprises a mitosis inhibitor. Mitosis inhibitors include anilofos, benefin, DCPA, dithiopyr, ethalfluralin, flufenacet, mefenacet, oryzalin, pendimethalin, thiazopyr and trifluralin, salts and esters thereof, and mixtures thereof.

In some embodiments, the additional herbicide comprises a PS I inhibitor such as diquat and paraquat, salts and esters thereof, and mixtures thereof.

In certain embodiments, the additional herbicide comprises a cellulose inhibitor such as dichlobenil and isoxaben.

In still further embodiments, the additional herbicide comprises an oxidative phosphorylation uncoupler such as dinoterb, and esters thereof.

In other embodiments, the additional herbicide comprises an auxin transport inhibitor such as diflufenzopyr and naptalam, salts and esters thereof, and mixtures thereof.

In various embodiments, the additional herbicide comprises a dihydropteroate synthase inhibitor such as asulam and salts thereof.

In some embodiments, the additional herbicide comprises a fatty acid and lipid biosynthesis inhibitor such as bensulide, butylate, cycloate, EPTC, esprocarb, molinate, pebulate, prosulfocarb, thiobencarb, triallate and vernolate, salts and esters thereof, and mixtures thereof.

Other Additives

The herbicidal compositions described herein can further include other additives. Other useful additives include, for example, biocides or preservatives (e.g., PROXEL, commercially available from Avecia), antifreeze agents (such as glycerol, sorbitol, or urea), antifoam agents (such as Antifoam SE23 from Wacker Silicones Corp.), and drift control agents.

Drift control agents suitable for the compositions and methods of the present invention are known to those skilled in the art and include GARDIAN, GARDIAN PLUS, DRI-GARD, and PRO-ONE XL, available from Van Diest Supply Co.; COMPADRE, available from Loveland Products, Inc.; BRONC MAX EDT, BRONC PLUS DRY EDT, EDT CONCENTRATE, and IN-PLACE, available from Wilbur-Ellis Company; STRIKE ZONE DF, available from Helena Chemical Co.; INTACT and INTACT XTRA, available from Precision Laboratories, LLC; and AGRHO DR 2000 and AGRHO DEP 775, available from the Solvay Group. Suitable drift control agents include, for example, guar-based (e.g., containing guar gum or derivatized guar gum) drift control agents. Various drift control products may also contain one or more conditioning agents in combination with the drift control agent(s).

The herbicidal compositions can further comprise an alkali metal phosphate such as dipotassium phosphate. Dipotassium phosphate, for example, can provide buffering and/or water-conditioning for the aqueous herbicidal compositions. Dipotassium phosphate is particularly effective as a replacement for ammonium sulfate in herbicidal composition application mixtures prepared using hard water. Similarly, the herbicidal compositions can further comprise an alkali metal carbonate, such as potassium carbonate, to provide additional buffering and/or water-conditioning for aqueous herbicidal compositions of the present invention. In some embodiments, the herbicidal compositions comprise an alkali metal phosphate. In other embodiments, the herbicidal compositions comprise an alkali metal carbonate. In still other embodiments, the herbicidal compositions comprise an alkali metal phosphate and an alkali metal carbonate.

When the herbicidal composition comprises an alkali metal phosphate, such as dipotassium phosphate, the molar ratio of the alkali metal phosphate to the monocarboxylic acid and/or salt thereof, can range, for example, from about 1:5 to about 5:1, from about 3:1 to about 1:3, or from about 2:1 to about 1:2. In some embodiments, the molar ratio of alkali metal phosphate to monocarboxylic acid and/or salt thereof, is about 1:1.

When the herbicidal composition comprises an alkali metal carbonate, such as potassium carbonate, the molar ratio of the alkali metal carbonate to the monocarboxylic acid and/or salt thereof, can range, for example, from about 1:5 to about 5:1, from about 3:1 to about 1:3, or from about 2:1 to about 1:2. In some embodiments, the molar ratio of alkali metal carbonate to monocarboxylic acid and/or salt thereof, is about 1:1.

Methods of Application

As noted, other aspects of the present invention are directed to methods of controlling the growth of unwanted plants. In various embodiments, the methods comprise diluting a herbicidal concentrate composition as described herein with water to form an application mixture and applying an herbicidally effective amount of the application mixture to the unwanted plants.

In various embodiments, the herbicidal application mixture is used to control weeds in a field of crop plants. Commercially important crop plants include, for example, corn, soybean, cotton, dry beans, snap beans, and potatoes. Crop plants include hybrids, inbreds, and transgenic or genetically modified plants having specific traits or combinations of traits including, without limitation, herbicide tolerance (e.g., resistance to glyphosate, glufosinate, dicamba, sethoxydim, PPO inhibitor, etc.), *Bacillus thuringiensis* (Bt), high oil, high lysine, high starch, nutritional density, and drought resistance. In some embodiments, the crop plants are tolerant to organophosphorus herbicides, acetolactate synthase (ALS) or acetohydroxy acid synthase (AHAS) inhibitor herbicides, auxin herbicides and/or acetyl CoA carboxylase (ACCase) inhibitor herbicides, In some embodiments, the crop plants are tolerant to glufosinate, dicamba, 2,4-D, MCPA, quizalofop, glyphosate and/or diclofop-methyl. In other embodiments, the crop plant is glufosinate and/or dicamba tolerant. In some embodiments, crop plants are glyphosate and/or glufosinate tolerant. In other embodiments, the crop plants are glyphosate, glufosinate and dicamba tolerant. In these and other embodiments, the crop plants are tolerant to PPO inhibitors.

The herbicidal application mixture may be applied to the field according to practices known to those skilled in the art. In some embodiments, the herbicidal application mixture is applied to the field post-emergence weeds. The herbicidally effective amount of the herbicidal application mixture to be applied is dependent upon various factors including the identity of the herbicides, the crop to be treated, and environmental conditions such as soil type and moisture content.

Herbicidal application mixtures of the present invention are useful for controlling a wide variety of weeds, i.e., plants that are considered to be a nuisance or a competitor of commercially important crop plants. Examples of weeds that may be controlled according to methods of the present invention include, but are not limited to, Meadow Foxtail (*Alopecurus pratensis*) and other weed species with the *Alopecurus* genus, Common Barnyard Grass (*Echinochloa crus-galli*) and other weed species within the *Echinochloa* genus, crabgrasses within the genus *Digitaria*, White Clover (*Trifolium repens*), Lambsquarters (*Chenopodium berlandieri*), Redroot Pigweed (*Amaranthus retroflexus*) and other weed species within the *Amaranthus* genus, Common Purslane (*Portulaca oleracea*) and other weed species in the *Portulaca* genus, *Chenopodium album* and other *Chenopodium* spp., *Setaria lutescens* and other *Setaria* spp., *Solanum nigrum* and other *Solanum* spp., *Lolium multiflorum* and other *Lolium* spp., *Brachiaria platyphylla* and other *Brachiaria* spp., *Sorghum halepense* and other *Sorghum* spp., *Conyza Canadensis* and other *Conyza* spp., and *Eleusine indica*. In some embodiments, the weeds comprise one or more glyphosate-resistant species, 2,4-D-resistant species, dicamba-resistant species and/or ALS inhibitor herbicide-resistant species. In some embodiments, the glyphosate-resistant weed species is selected from the group consisting of *Amaranthus palmeri*, *Amaranthus rudis*, *Ambrosia artemisiifolia*, *Ambrosia trifida*, *Conyza bonariensis*, *Conyza canadensis*, *Digitaria insularis*, *Echinochloa colona*, *Eleusine indica*, *Euphorbia heterophylla*, *Lolium multiflorum*, *Lolium rigidum*, *Plantago lancelata*, *Sorghum halepense*, and *Urochloa panicoides*.

Definitions

The term "hydrocarbyl" as used herein describes organic compounds or radicals consisting exclusively of the elements carbon and hydrogen. These moieties include alkyl, alkenyl, alkynyl, and aryl moieties. These moieties also include alkyl, alkenyl, alkynyl, and aryl moieties substituted with other aliphatic or cyclic hydrocarbon groups, such as alkaryl, alkenaryl and alkynaryl. Unless otherwise indicated, these moieties preferably comprise 1 to 30 carbon atoms.

The term "hydrocarbylene" as used herein describes radicals joined at two ends thereof to other radicals in an organic compound, and which consist exclusively of the elements carbon and hydrogen. These moieties include alkylene, alkenylene, alkynylene, and arylene moieties. These moieties also include alkyl, alkenyl, alkynyl, and aryl moieties substituted with other aliphatic or cyclic hydrocarbon groups, such as alkaryl, alkenaryl and alkynaryl. Unless otherwise indicated, these moieties preferably comprise 1 to 30 carbon atoms.

The term "substituted hydrocarbyl" as used herein describes hydrocarbyl moieties that are substituted with at least one atom other than carbon, including moieties in which a carbon chain atom is substituted with a hetero atom such as nitrogen, oxygen, silicon, phosphorous, boron, sulfur, or a halogen atom. These substituents include halogen, heterocyclo, alkoxy, alkenoxy, alkynoxy, aryloxy, hydroxy, protected hydroxy, ketal, acyl, acyloxy, nitro, amino, amido, cyano, thiol, acetal, sulfoxide, ester, thioester, ether, thioether, hydroxyalkyl, urea, guanidine, amidine, phosphate, amine oxide, and quaternary ammonium salt.

The "substituted hydrocarbylene" moieties described herein are hydrocarbylene moieties which are substituted with at least one atom other than carbon, including moieties in which a carbon chain atom is substituted with a hetero atom such as nitrogen, oxygen, silicon, phosphorous, boron, sulfur, or a halogen atom. These substituents include halogen, heterocyclo, alkoxy, alkenoxy, alkynoxy, aryloxy, hydroxy, protected hydroxy, ketal, acyl, acyloxy, nitro, amino, amido, cyano, thiol, acetal, sulfoxide, ester, thioester, ether, thioether, hydroxyalkyl, urea, guanidine, amidine, phosphate, amine oxide, and quaternary ammonium salt.

Unless otherwise indicated, the alkyl groups described herein are preferably lower alkyl containing from one to 18 carbon atoms in the principal chain and up to 30 carbon atoms. They may be straight or branched chain or cyclic and include methyl, ethyl, propyl, isopropyl, n-butyl, isobutyl, hexyl, 2-ethylhexyl, and the like.

Unless otherwise indicated, the alkenyl groups described herein are preferably lower alkenyl containing from two to 18 carbon atoms in the principal chain and up to 30 carbon atoms. They may be straight or branched chain or cyclic and include ethenyl, propenyl, isopropenyl, butenyl, isobutenyl, hexenyl, and the like. Unless otherwise indicated, the alkynyl groups described herein are preferably lower alkynyl containing from two to 18 carbon atoms in the principal chain and up to 30 carbon atoms. They may be straight or branched chain and include ethynyl, propynyl, butynyl, isobutynyl, hexynyl, and the like. The term "aryl" as used herein alone or as part of another group denote optionally substituted homocyclic aromatic groups, preferably monocyclic or bicyclic groups containing from 6 to 12 carbons in the ring portion, such as phenyl, biphenyl, naphthyl, substituted phenyl, substituted biphenyl or substituted naphthyl. Phenyl and substituted phenyl are the more preferred aryl.

As used herein, the alkyl, alkenyl, alkynyl and aryl groups can be substituted with at least one atom other than carbon, including moieties in which a carbon chain atom is substituted with a hetero atom such as nitrogen, oxygen, silicon, phosphorous, boron, sulfur, or a halogen atom. These substituents include hydroxy, nitro, amino, amido, nitro, cyano, sulfoxide, thiol, thioester, thioether, ester and ether, or any other substituent which can increase the compatibility of the surfactant and/or its efficacy enhancement in the potassium glyphosate formulation without adversely affecting the storage stability of the formulation.

The terms "halogen" or "halo" as used herein alone or as part of another group refer to chlorine, bromine, fluorine, and iodine. Fluorine substituents are often preferred in surfactant compounds.

Unless otherwise indicated, the term "hydroxyalkyl" includes alkyl groups substituted with at least one hydroxy group, e.g., bis(hydroxyalkyl)alkyl, tris(hydroxyalkyl)alkyl and poly(hydroxyalkyl)alkyl groups. Preferred hydroxyalkyl groups include hydroxymethyl (—$CH_2OH$), and hydroxyethyl (—$C_2H_4OH$), bis(hydroxy-methyl)methyl (—$CH(CH_2OH)_2$), and tris(hydroxymethyl)methyl (—$C(CH_2OH)_3$).

The term "cyclic" as used herein alone or as part of another group denotes a group having at least one closed ring, and includes alicyclic, aromatic (arene) and heterocyclic groups.

The terms "heterocyclo" or "heterocyclic" as used herein alone or as part of another group denote optionally substituted, fully saturated or unsaturated, monocyclic or bicyclic, aromatic or nonaromatic groups having at least one heteroatom in at least one ring, and preferably 5 or 6 atoms in each ring. The heterocyclo group preferably has 1 or 2 oxygen atoms, 1 or 2 sulfur atoms, and/or 1 to 4 nitrogen atoms in the ring, and may be bonded to the remainder of the molecule through a carbon or heteroatom. Exemplary heterocyclo include heteroaromatics such as furyl, thienyl, pyridyl, oxazolyl, pyrrolyl, indolyl, quinolinyl, or isoquinolinyl and the like, and non-aromatic heterocyclics such as tetrahydrofuryl, tetrahydrothienyl, piperidinyl, pyrrolidino, etc. Exemplary substituents include one or more of the following groups: hydrocarbyl, substituted hydrocarbyl, keto, hydroxy, protected hydroxy, acyl, acyloxy, alkoxy, alkenoxy, alkynoxy, aryloxy, halogen, amido, amino, nitro, cyano, thiol, thioester, thioether, ketal, acetal, ester and ether.

The term "heteroaromatic" as used herein alone or as part of another group denote optionally substituted aromatic groups having at least one heteroatom in at least one ring, and preferably 5 or 6 atoms in each ring. The heteroaromatic group preferably has 1 or 2 oxygen atoms, 1 or 2 sulfur atoms, and/or 1 to 4 nitrogen atoms in the ring, and may be bonded to the remainder of the molecule through a carbon or heteroatom. Exemplary heteroaromatics include furyl, thienyl, pyridyl, oxazolyl, pyrrolyl, indolyl, quinolinyl, or isoquinolinyl and the like. Exemplary substituents include one or more of the following groups: hydrocarbyl, substituted hydrocarbyl, keto, hydroxy, protected hydroxy, acyl, acyloxy, alkoxy, alkenoxy, alkynoxy, aryloxy, halogen, amido, amino, nitro, cyano, thiol, thioether, thioester, ketal, acetal, ester and ether.

The term "acyl," as used herein alone or as part of another group, denotes the moiety formed by removal of the hydroxyl group from the group —COOH of an organic carboxylic acid, e.g., RC(O)—, wherein R is $R^1$, $R^1O$—, $R^1R^2N$—, or $R^1S$—, $R^1$ is hydrocarbyl, hetero substituted hydrocarbyl, or heterocyclo and $R^2$ is hydrogen, hydrocarbyl or substituted hydrocarbyl.

The term "acyloxy," as used herein alone or as part of another group, denotes an acyl group as described above bonded through an oxygen linkage (—O—), e.g., RC(O)O— wherein R is as defined in connection with the term "acyl."

When a maximum or minimum "average number" is recited herein with reference to a structural feature such as oxyethylene units, it will be understood by those skilled in the art that the integer number of such units in individual molecules in a surfactant preparation typically varies over a range that can include integer numbers greater than the maximum or smaller than the minimum "average number". The presence in a composition of individual surfactant molecules having an integer number of such units outside the stated range in "average number" does not remove the composition from the scope of the present invention, so long as the "average number" is within the stated range and other requirements are met.

EXAMPLES

The following non-limiting examples are provided to further illustrate the present invention.

Example 1: Preparation of Formulation ID Series 10049286

Formulations comprising 65 EA:35 TBA dicamba and ammonium glufosinate were prepared using the quantities of ingredients listed in Table 1. As one example, formulation 10049286-1 in Table 1 was prepared by adding 50.2 grams of water to 15.5 grams of glufosinate, followed by 34.5 grams of 65 EA:35 TBA dicamba. The resulting mixture was stirred for ten minutes. The surfactant, if used, was added last. In formulations 10049286-2 to −5, extra water was added until a clear solution was obtained. Only formulation 10049286-1 formed a clear solution initially. All remaining formulations required addition of water to turn clear and form one phase (i.e., a single layer).

TABLE 1

Formulation ID Series 10049286

| | Ingredient (wt. %) | | | | |
|---|---|---|---|---|---|
| Formulation No. | Ammonium Glufosinate (97%) | 65:35 EA:TBA dicamba (41.0% a.e.) | Water | AGNIQUE PG8107 | Potassium Acetate |
| 10049286-1 | 15.5 | 34.39 | 50.1 | — | — |
| 10049286-2 | 17.0 | 37.8 | 45.2 | — | — |
| 10049286-3 | 17.0 | 37.8 | 43.2 | 2.0 | — |
| 10049286-4 | 17.0 | 37.8 | 41.2 | 4.0 | — |
| 10049286-5 | 15.5 | 34.39 | 47.0 | — | 3.10 |

Example 2: Preparation of Monoethanolammonium (EA) Dicamba

Water and monoethanolammonium were weighed into a 20 L plastic reactor. Dicamba acid was added at a rate such that the internal temperature did not rise above 50° C. Then, the remaining monoethanolamine and water were added. The quantity of components used is listed in Table 2. The ingredients were stirred for two hours. Specific gravity of the resulting composition was 1.2830 and pH was 8.37.

TABLE 2

Formulation of 55.0% a.e. EA Dicamba

| Ingredient | wt. % |
|---|---|
| Dicamba Tech (98.3% a.e.) | 55.95 |
| Monoethanolammonium | 15.46 |
| water | 28.59 |
| Total | 100.0 |

Example 3: Preparation of Formulation ID Series 10049325

Formulations comprising EA Dicamba and ammonium glufosinate were prepared using the quantities of ingredients listed in Table 3. As one example, formulation 10049325-1 in Table 3 was prepared by adding 45.7 grams of water to 20.6 grams of ammonium glufosinate. The resulting mixture was stirred. EA dicamba was then added and the mixture was stirred for ten minutes. When used, the surfactant was added last. The relative ratio of the herbicides was targeted to achieve field rates were 595 g/ha a.i. glufosinate and 560 g/ha a.e. dicamba. Specific gravity and 2.5% a.e. pH of the resulting composition were measured.

TABLE 3

Formulation ID Series 10049325

| | Ingredient (wt. %) | | | | |
|---|---|---|---|---|---|
| Formulation No. | Ammonium Glufosinate (97%) | EA Dicamba (55.65% a.e.) | Water | Potassium Acetate | WITCOLATE 7093 |
| 10049325-1 | 20.6 | 33.78 | 45.6 | — | — |
| 10049325-2 | 20.6 | 33.78 | 33.1 | 12.50 | — |
| 10049325-3 | 20.6 | 33.78 | 29.1 | 12.50 | 4.00 |

Example 4: Preparation of Formulation ID Series 10050681

Various surfactant systems such as AGNIQUE SLES-270 (available from BASF) were used in combination with EA dicamba, ammonium glufosinate, monocarboxylic acid and/or salt thereof and co-surfactant AL-2559 (available from Croda). Formulations were prepared using the quantities of ingredients listed in Table 4. As one example, formulation 10050681-2 in Table 4 was prepared by dissolving 10.3 grams of ammonium glufosinate in 18.7 grams of water while stirring. Then, 2.1 grams of potassium acetate was added, followed by 16.9 grams of EA dicamba, resulting in a glufosinate/EA dicamba premix. Then, 2.1 grams of AGNIQUE SLES-270 was added, followed by 20 minutes of stirring.

Monophasic formulations were achieved using AGNIQUE SLES-270 with low potassium acetate concentration (0% to 4.2%). Co-surfactant AL-2559 promoted compatibility of AGNIQUE SLES-270, ammonium glufosinate, EA dicamba and potassium acetate. Monophasic formulations were achieved using a 1:1 ratio (by mass) of AGNIQUE SLES-270 to AL-2559 with 8.3% potassium acetate. Monophasic formulations were also achieved using a 1:3 ratio (by mass) of AGNIQUE SLES-270 to AL-2559 with 12.5% potassium acetate. Formulations were tested for volatility and in greenhouse. Premixes of EA dicamba and ammonium glufosinate having 12.5% potassium acetate resulted in cloudy solution upon addition of AGNIQUE SLES-270. Therefore, addition of co-surfactant AL-2559 was tested to check compatibility.

TABLE 4

Formulation ID Series 10050681

Ingredient (wt. %)

| Formulation No. | Ammonium Glufosinate (97%) | EA Dicamba (55.65% a.e.) | Water | Potassium Acetate | AGNIQUE SLES-270 | AL-2559-LQ-(MV) |
|---|---|---|---|---|---|---|
| 10050681-1 | 20.6 | 34.09 | 41.3 | — | 4.00 | — |
| 10050681-2 | 20.6 | 34.09 | 37.1 | 4.20 | 4.00 | — |
| 10050681-3 | 20.6 | 34.09 | 37.1 | 4.20 | 4.00 | — |
| 10050681-4 | 20.6 | 34.09 | 33.0 | 8.30 | 4.00 | — |
| 10050681-5 | 20.6 | 34.09 | 35.0 | 6.25 | 4.00 | — |
| 10050681-6 | 20.6 | 34.0 | 35.0 | — | 4.0 | 2.0 |
| 10050681-7 | 20.6 | 34.0 | 31.0 | 8.3 | 4.0 | 2.0 |
| 10050681-8 | 20.6 | 34.0 | 33.0 | 8.3 | 2.0 | 2.0 |
| 10050681-9 | 20.6 | 34.0 | 28.8 | 12.5 | 2.0 | 2.0 |
| 10050681-10 | 20.6 | 34.0 | 26.8 | 12.5 | 2.0 | 4.0 |
| 10050681-11 | 20.6 | 34.0 | 24.8 | 12.5 | 2.0 | 6.0 |
| 10050681-12 | 20.6 | 34.0 | 16.8 | 12.5 | 4.0 | 12.0 |

Example 5: Preparation of Formulation ID Series 10050629

Formulations were prepared using the quantities of ingredients listed in Table 5. As one example, formulation 10050629-1 in Table 5 was prepared by adding 53.8 grams of water to 41.2 grams of ammonium glufosinate while stirring. This was followed by addition of 5.0 grams of AGNIQUE SLES-270 and stirring for 20 minutes. For formulations comprising only glufosinate solution, only surfactant AL-2559 formed a clear amber solution at the prepared concentration. Other surfactants such as AGNIQUE SLES-270, T-MAZ 20 (available from BASF), KLEARFAC AA 270 (available from BASF), ATPLUS 401 (available from Croda), ARLATONET-NV (available from Croda), and CIRRASOL G-3780A (available from Croda) resulted in cloudy mixtures with separated phases.

For formulation 10050692-10 to -17, various surfactants were added to the ammonium glufosinate and EA dicamba premix having 12.5% potassium acetate (dicamba to potassium acetate molar ratio was 1:1.5). Monophasic formulations were obtained using AL-2559, ADSEE C-80W (available from Akzo Nobel), SYNPERONIC 91/6 (available from Croda), ATPLUS 401 (available from Croda), and C-6178 (available from Akzo Nobel). Cloudy and two-phase formulations were obtained using surfactants AGNIQUE SLES-270, C-6330 (available from Akzo Nobel), and AGNIQUE TAM 15 (available from BASF). Clear amber formulations were tested for volatility and in greenhouse conditions. Various surfactants were screened with ammonium glufosinate and EA dicamba to test compatibility and stability of the resulting mixtures.

TABLE 5

Formulation ID Series 10050629

Ingredient (wt. %)

| Formulation No. | Ammonium Glufosinate (97%) | EA Dicamba (55.65% a.e.) | Water | Potassium Acetate | Surfactant | Type of Surfactant |
|---|---|---|---|---|---|---|
| 10050629-1 | 41.2 | — | 53.8 | — | 5.0 | AGNIQUE SLES-270 |
| 10050629-2 | 41.2 | — | 53.8 | — | 5.0 | T-MAZ 20 |
| 10050629-3 | 41.2 | — | 53.8 | — | 5.0 | KLEARFAC AA 270 |
| 10050629-4 | 41.2 | — | 53.8 | — | 5.0 | AL-2559-LQ-(MV) |
| 10050629-5 | 41.2 | — | 53.8 | — | 5.0 | ATPLUS 401-LQ-(AP) |

TABLE 5-continued

Formulation ID Series 10050629

Ingredient (wt. %)

| Formulation No. | Ammonium Glufosinate (97%) | EA Dicamba (55.65% a.e.) | Water | Potassium Acetate | Surfactant | Type of Surfactant |
|---|---|---|---|---|---|---|
| 10050629-6 | 41.2 | — | 53.8 | — | 5.0 | ARLATONE T-NV-LQ-(AP) |
| 10050629-7 | 41.2 | — | 53.8 | — | 5.0 | CIRRASOL G-370A-NV-LQ-(AP) |
| 10050629-8 | 41.2 | — | 48.8 | — | 10.0 | AGNIQUE SLES-270 |
| 10050629-9 | 41.2 | — | 48.8 | — | 10.0 | AL-2559-LQ-(MV) |
| 10050629-10 | 20.6 | 34.0 | 28.8 | 12.5 | 4.0 | AL-2559-LQ-(MV) |
| 10050629-11 | 20.6 | 34.0 | 28.8 | 12.5 | 4.0 | ADSEE C-80W |
| 10050629-12 | 20.6 | 34.0 | 28.8 | 12.5 | 4.0 | AGNIQUE SLES-270 |
| 10050629-13 | 20.6 | 34.0 | 28.8 | 12.5 | 4.0 | SYNPERONIC 91/6-LQ-(TH) |
| 10050629-14 | 20.6 | 34.0 | 28.8 | 12.5 | 4.0 | ATPLUS 401-LQ-(AP) |
| 10050629-15 | 20.6 | 34.0 | 28.8 | 12.5 | 4.0 | C-6178 |
| 10050629-16 | 20.6 | 34.0 | 28.8 | 12.5 | 4.0 | C-6330 |
| 10050629-17 | 20.6 | 34.0 | 28.8 | 12.5 | 4.0 | AGNIQUE TAM 15 |

Example 6: Preparation of Formulation ID Series 10051483

Formulations were prepared using the quantities of ingredients listed in Table 6. Potassium acetate was added to the aqueous solution of ammonium glufosinate, followed by EA dicamba. Surfactant was added last.

TABLE 6

Formulation ID Series 10051483

Ingredient (wt. %)

| Formulation No. | Ammonium Glufosinate (97%) | EA Dicamba (55.15% a.e.) | Water | Potassium Acetate | AL-2559-LQ-(MV) |
|---|---|---|---|---|---|
| 10051483-1 | 20.6 | 34.09 | 33.0 | 8.30 | 4.00 |
| 10051483-2 | 20.6 | 34.09 | 31.3 | 10.00 | 4.00 |

Example 7: Preparation of Formulation ID Series 10053200

Formulations were prepared using the quantities of ingredients listed in Table 7. Potassium acetate was added to the aqueous solution of ammonium glufosinate, followed by EA dicamba. Surfactant was added last.

TABLE 7

Formulation ID Series 10053200

Ingredient (wt. %)

| Formulation No. | Ammonium Glufosinate (97%) | EA Dicamba (55.26% a.e.) | Water | Potassium Acetate | Surfactant | Type of Surfactant |
|---|---|---|---|---|---|---|
| 10053200-1 | 20.6 | 34.02 | 28.9 | 12.50 | 4.00 | WITCOLATE |
| 10053200-2 | 20.6 | 34.02 | 28.9 | 12.50 | 4.00 | C-6178 |
| 10053200-3 | 20.6 | 34.02 | 28.9 | 12.50 | 4.00 | ADSEE C-80W |
| 10053200-4 | 20.6 | 34.02 | 22.9 | 12.50 | 10.00 | AGNIQUE PG 8107 |
| 10053200-5 | 20.6 | 34.02 | 16.9 | 12.50 | 16.00 | AGNQIUE PG 8107 |
| 10053200-6 | 20.6 | 34.02 | 16.9 | 12.50 | 16.00 | AL-2559-LQ-(MV) |

TABLE 7-continued

Formulation ID Series 10053200

Ingredient (wt. %)

| Formulation No. | Ammonium Glufosinate (97%) | EA Dicamba (55.26% a.e.) | Water | Potassium Acetate | Surfactant | Type of Surfactant |
|---|---|---|---|---|---|---|
| 10053200-7 | 20.6 | 34.02 | 22.9 | 12.50 | 6.00 | ADSEE C-80W |
|  |  |  |  |  | 4.00 | AGNIQUE PG 8107 |
| 10053200-8 | 20.6 | 34.02 | 16.9 | 12.50 | 16.00 | AGNIQUE PG 8107 |
| 10053200-9 | 20.6 | 34.02 | 16.9 | 12.50 | 16.00 | AL-2559-LQ-(MV) |

Example 8: Preparation of Formulation ID Series 10055273

Formulations were prepared using the quantities of ingredients listed in Table 8. Acetic acid was added to a solution of KOH in water, followed by addition of ammonium glufosinate and EA dicamba. Surfactant was added last.

TABLE 8

Formulation ID Series 10055273

Ingredient (wt. %)

| Formulation No. | Ammonium Glufosinate (97%) | EA Dicamba (55.26% a.e.) | Water | AcOH, EMD | KOH (45% w/w) BDH | ADSEE C-80W | Dipotassium phosphate (50% w/w), ICL | WITCOLATE 7093 | AL-2559 |
|---|---|---|---|---|---|---|---|---|---|
| 10055273-1 | 20.0 | 34.02 | 18.5 | 7.65 | 15.88 | 4.00 | — | — | — |
| 10055273-2 | 20.0 | 34.02 | 19.7 | 7.65 | 14.66 | 4.00 | — | — | — |
| 10055273-3 | 20.0 | 34.02 | 21.3 | 7.65 | 12.99 | 4.00 | — | — | — |
| 10055273-4 | 20.0 | 34.02 | 20.3 | 7.65 | 14.08 | 4.00 | — | — | — |
| 10055273-5* | 20.0 | 34.02 | 3.7 | 7.65 | 15.88 | 4.00 | 14.80 | — | — |
| 10055273-6 | 20.0 | 34.02 | 4.6 | 2.55 | 5.29 | 4.00 | 29.58 | — | — |
| 10055273-7 | 20.0 | 34.02 | 14.1 | 6.12 | 11.72 | 4.00 | 10.00 | — | — |
| 10055273-8 | 20.0 | 34.02 | 15.5 | 6.12 | 10.40 | 4.00 | 10.00 | — | — |
| 10055273-9 | 20.0 | 34.02 | 15.7 | 7.65 | 14.66 | 4.00 | — | 4.00 | — |
| 10055273-10 | 20.0 | 34.02 | 15.7 | 7.65 | 14.66 | 4.00 | — | — | 4.00 |

10055273-5* initially yields clear monophasic solution. When left overnight results in phase separation.

Example 9: Preparation of Formulation ID Series 10053726

Formulations were prepared using the quantities of ingredients listed in Table 9. Potassium acetate was added to the aqueous solution of ammonium glufosinate, followed by addition of EA dicamba. Surfactant was added last. Surfactants used were SUGA FAX at 4%, 10% and 16%, SUGA NATE 100 NC and 160NC at 4%, 10% and 16%, and poly SUGA MUSLE D6 and D9 at 4%, 10% and 16%, available from Colonial Chemical.

TABLE 9

Formulation ID Series 10053726

Ingredient (wt. %)

| Formulation No. | Ammonium Glufosinate (97.1%) | EA Dicamba (55.19% a.e.) | Water | Potassium Acetate | Surfactant | Type of Surfactant |
|---|---|---|---|---|---|---|
| 10053726-1 | 20.6 | 34.06 | 28.8 | 12.50 | 4.00 | SUGA FAX D04 |
| 10053726-2 | 20.6 | 34.06 | 28.8 | 12.50 | 4.00 | SUGA FAX D08 |
| 10053726-3 | 20.6 | 34.06 | 28.8 | 12.50 | 4.00 | SUGA FAX D10 |
| 10053726-4 | 20.6 | 34.06 | 28.8 | 12.50 | 4.00 | SUGA FAX D12 |
| 10053726-5 | 20.6 | 34.06 | 28.8 | 12.50 | 4.00 | SUGA FAX D86 |
| 10053726-6 | 20.6 | 34.06 | 22.8 | 12.50 | 10.00 | SUGA FAX D04 |

TABLE 9-continued

Formulation ID Series 10053726

Ingredient (wt. %)

| Formulation No. | Ammonium Glufosinate (97.1%) | EA Dicamba (55.19% a.e.) | Water | Potassium Acetate | Surfactant | Type of Surfactant |
|---|---|---|---|---|---|---|
| 10053726-7 | 20.6 | 34.06 | 22.8 | 12.50 | 10.00 | SUGA FAX D08 |
| 10053726-8 | 20.6 | 34.06 | 22.8 | 12.50 | 10.00 | SUGA FAX D10 |
| 10053726-9 | 20.6 | 34.06 | 22.8 | 12.50 | 10.00 | SUGA FAX D12 |
| 10053726-10 | 20.6 | 34.06 | 22.8 | 12.50 | 10.00 | SUGA FAX D86 |
| 10053726-11 | 20.6 | 34.06 | 16.8 | 12.50 | 16.00 | SUGA FAX D04 |
| 10053726-12 | 20.6 | 34.06 | 16.8 | 12.50 | 16.00 | SUGA FAX D08 |
| 10053726-13 | 20.6 | 34.06 | 16.8 | 12.50 | 16.00 | SUGA FAX D10 |
| 10053726-14 | 20.6 | 34.06 | 16.8 | 12.50 | 16.00 | SUGA FAX D12 |
| 10053726-15 | 20.6 | 34.06 | 16.8 | 12.50 | 16.00 | SUGA FAX D86 |
| 10053726-16 | 20.6 | 34.02 | 28.9 | 12.50 | 4.00 | SUGA NATE 100 NC |
| 10053726-17 | 20.6 | 34.02 | 28.9 | 12.50 | 4.00 | SUGA NATE 160 NC |
| 10053726-18 | 20.6 | 34.02 | 22.9 | 12.50 | 10.00 | SUGA NATE 100 NC |
| 10053726-19 | 20.6 | 34.02 | 22.9 | 12.50 | 10.00 | SUGA NATE 160 NC |
| 10053726-20 | 20.6 | 34.02 | 16.9 | 12.50 | 16.00 | SUGA NATE 100 NC |
| 10053726-21 | 20.6 | 34.02 | 16.9 | 12.50 | 16.00 | SUGA NATE 160 NC |
| 10053726-22 | 20.6 | 34.02 | 28.9 | 12.50 | 4.00 | POLY SUGA MULSE D6 |
| 10053726-23 | 20.6 | 34.02 | 28.9 | 12.50 | 4.00 | POLY SUGA MULSE D9 |
| 10053726-24 | 20.6 | 34.02 | 22.9 | 12.50 | 10.00 | POLY SUGA MULSE D6 |
| 10053726-25 | 20.6 | 34.02 | 22.9 | 12.50 | 10.00 | POLY SUGA MULSE D9 |
| 10053726-26 | 20.6 | 34.02 | 16.9 | 12.50 | 16.00 | POLY SUGA MULSE D6 |
| 10053726-27 | 20.6 | 34.02 | 16.9 | 12.50 | 16.00 | POLY SUGA MULSE D9 |

Example 10: Preparation of Formulation ID Series 10051568

Formulations were prepared using the quantities of ingredients listed in Table 10. Potassium acetate was added to the aqueous solution of ammonium glufosinate, followed by addition of EA dicamba. Surfactant was added last.

TABLE 10

Formulation ID Series 10051568

Ingredient (wt. %)

| Formulation No. | Ammonium Glufosinate (97%) | EA Dicamba (55.19% a.e.) | Water | Potassium Acetate | Surfactant | Type of Surfactant |
|---|---|---|---|---|---|---|
| 10051568-1 | 20.6 | 34.06 | 28.8 | 12.50 | 4.00 | AL-2559 |
| 10051568-2 | 20.6 | 34.06 | 28.8 | 12.50 | 4.00 | WITCOLATE |
| 10051568-3 | 20.6 | 34.06 | 28.8 | 12.50 | 4.00 | ADSEE C-80W |
| 10051568-4 | 20.6 | 34.06 | 28.8 | 12.50 | 4.00 | ATPLUS 401 |
| 10051568-5 | 20.6 | 34.06 | 28.8 | 12.50 | 4.00 | SYNPERONIC 91/6 |
| 10051568-6 | 20.6 | 34.06 | 28.8 | 12.50 | 4.00 | C-6178 |
| 10051568-7 | 20.6 | 34.06 | 24.8 | 12.50 | 4.00 | AGNIQUE SLES-270 |
|  |  |  |  |  | 4.00 | AGNIQUE PG 8107 |

Example 11: Preparation of Formulation ID Series 10051674

Formulations were prepared using the quantities of ingredients listed in Tables 11.1 and 11.2. Acetic acid was added to a solution of KOH in water, followed by addition of ammonium glufosinate and EA dicamba. Surfactant was added last.

TABLE 11.1

Formulation ID Series 10051674

| Formulation No. | Ammonium Glufosinate (97%) | EA Dicamba (55.15% a.e.) | Water | AcOH, EMD | KOH (45% w/w), BDH | Surfactant | Type of Surfactant |
|---|---|---|---|---|---|---|---|
| 10051674-1 | 20.6 | 34.09 | 7.1 | 7.66 | 10.58 | 20.00 | AL-2559-LQ-(MV) |
| 10051674-2 | 20.6 | 34.09 | 7.1 | 7.66 | 10.58 | 20.00 | WITCOLATE |
| 10051674-3 | 20.6 | 34.09 | 7.1 | 7.66 | 10.58 | 20.00 | ATPLUS 401 |
| 10051674-4 | 20.6 | 34.09 | 7.1 | 7.66 | 10.58 | 20.00 | AGNIQUE PG 8107 |

Example 11.2. Formulation ID Series 10059400, 10057651 and 10063876

Ingredient (wt. %)

| Formulation No. | Ammonium Glufosinate (100%) | EA Dicamba (55.71 or 55.26* % a.e.) | Water | AcOH, EMD | KOH (45% w/w), BDH | Surfactant | Type of Surfactant |
|---|---|---|---|---|---|---|---|
| 10059400-5 | 21.0 | 31.95 | 21.9 | 7.25 | 13.89 | 4 | AkzoNobel ADSEE C-80W |
| 10057651-5 | 22.1 | 30.22* | 23.9 | 6.80 | 13.02 | 4 | AkzoNobel ADSEE C-80W |
| 10063876-1 | 21.0 | 31.95 | 46.6 | 9.67 | 18.52 | 4.20 | AkzoNobel ADSEE C-80W |
| 10063876-2 | 21.0 | 31.95 | 7.6 | 12.08 | 23.15 | 4.20 | AkzoNobel ADSEE C-80W |

Example 12: Preparation of Formulation ID Series 10051453

Formulations were prepared using the quantities of ingredients listed in Table 12. Potassium acetate was added to the aqueous solution of ammonium glufosinate, followed by EA dicamba. When used, surfactant was added last.

TABLE 12

Formulation ID Series 10051453

| Formulation No. | Ammonium Glufosinate (97%) | EA Dicamba (55.15% a.e.) | Water | Potassium Acetate | Surfactant | Type of Surfactant |
|---|---|---|---|---|---|---|
| 10051453-1 | 20.6 | 34.09 | 32.8 | 12.50 | — | — |
| 10051453-2 | 20.6 | 34.09 | 22.8 | 12.50 | 10.00 | WITCOLATE |
| 10051453-3 | 20.6 | 34.09 | 12.8 | 12.50 | 20.00 | AL-2559-LQ-(MV) |
| 10051453-4 | 20.6 | 34.09 | 22.8 | 12.50 | 10.00 | SYNPERONIC 91/6-LQ-(TH) |
| 10051453-5 | 20.6 | 34.09 | 12.8 | 12.50 | 20.00 | WITCOLATE |
| 10051453-6 | 20.6 | 34.09 | 24.8 | 12.50 | 8.00 | SYNPERONIC 91/6-LQ-(TH) |
| 10051453-7 | 20.6 | 34.09 | 27.8 | 12.50 | 5.00 | SYNPERONIC 91/6-LQ-(TH) |
| 10051453-8 | 20.6 | 34.09 | 16.8 | 12.50 | 16.00 | AL-2559-LQ-(MV) |
| 10051453-9 | 20.6 | 34.09 | 16.8 | 12.50 | 16.00 | WITCOLATE |
| 10051453-10 | 20.6 | 34.09 | 26.8 | 12.50 | 6.00 | ATPLUS 401 |
| 10051453-11 | 20.6 | 34.09 | 22.8 | 12.50 | 10.00 | ATPLUS 401 |
| 10051453-12 | 20.6 | 34.09 | 25.8 | 12.50 | 7.00 | ADSEE C-80W |
| 10051453-13 | 20.6 | 34.09 | 16.8 | 12.50 | 16.00 | ATPLUS 401 |
| 10051453-14 | 20.6 | 34.09 | 26.8 | 12.50 | 6.00 | C-6178 |
| 10051453-15 | 20.6 | 34.09 | 26.8 | 12.50 | 6.00 | ADSEE C-80W |
| 10051453-16 | 20.6 | 34.09 | 16.8 | 12.50 | 16.00 | AGNIQUE PG 8107 |
| 10051453-17 | 20.6 | 34.09 | 32.8 | 12.50 | — | — |
| 10051453-18 | 20.6 | 34.09 | 28.8 | 12.50 | 4.00 | AGNQIUE PG 8107 |

TABLE 12-continued

Formulation ID Series 10051453

| | Ingredient (wt. %) | | | | | |
|---|---|---|---|---|---|---|
| Formulation No. | Ammonium Glufosinate (97%) | EA Dicamba (55.15% a.e.) | Water | Potassium Acetate | Surfactant | Type of Surfactant |
| 10051453-19 | 20.6 | 34.09 | 22.8 | 12.50 | 10.00 | AGNIQUE PG 8107 |
| 10051453-20 | 20.6 | 34.09 | 25.8 | 12.50 | 6.00 | C-6178 |
| | | | | | 1.00 | AL-2559 |

Example 13: Preparation of Formulation ID Series 10052136

Formulations were prepared using the quantities of ingredients listed in Table 13. Potassium acetate was added to the aqueous solution of ammonium glufosinate, followed by addition of EA dicamba. Surfactant was added last.

TABLE 13

Formulation ID Series 10052136

| | Ingredient (wt. %) | | | | | |
|---|---|---|---|---|---|---|
| Formulation No. | Ammonium Glufosinate (97%) | EA Dicamba (55.15% a.e.) | Water | Potassium Acetate | Surfactant | Type of Surfactant |
| 10052136-1 | 20.6 | 34.09 | 28.8 | 12.50 | 4.00 | BREAK-THRU OE 441 |
| 10052136-2 | 20.6 | 34.09 | 28.8 | 12.50 | 4.00 | BREAK-THRU S240 |
| 10052136-3 | 20.6 | 34.09 | 28.8 | 12.50* | 4.00 | PF 8000 |
| 10052136-4 | 20.6 | 34.09 | 22.8 | 12.50 | 10.00 | PF 8000 |
| 10052136-5 | 20.6 | 34.09 | 16.8 | 12.50 | 16.00 | PF 8000 |
| 10052136-6 | 20.6 | 34.09 | 28.8 | 12.50 | 4.00 | SURFOM 1322 SC |
| 10052136-7 | 20.6 | 34.09 | 28.8 | 12.50 | 4.00 | SURFOM 1325 Sc |
| 10052136-8 | 20.6 | 34.09 | 28.8 | 12.50 | 4.00 | SURFOM 1323 Sc |
| 10052136-9 | 20.6 | 34.09 | 16.8 | 12.50 | 16.00 | SURFOM 1322 SC |
| 10052136-10 | 20.6 | 34.09 | 16.8 | 12.50 | 16.00 | SURFOM 1325 SC |
| 10052136-11 | 20.6 | 34.09 | 26.8 | 12.50 | 6.00 | SURFOM 1323 SC |
| 10052136-12 | 20.6 | 34.09 | 26.8 | 12.50 | 6.00 | SURFOM 1322 SC |
| 10052136-13 | 20.6 | 34.06** | 28.8 | 12.50 | 4.00 | STEPFAC 8180 |
| 10052136-14 | 20.6 | 34.06** | 28.8 | 12.50 | 4.00 | STEPFAC 8182 |
| 10052136-15 | 20.6 | 34.06** | 28.8 | 12.50 | 4.00 | STEPFAC 8182 |
| 10052136-16 | 20.6 | 34.06** | 22.8 | 12.50 | 10.00 | STEPFAC 8180 |
| 10052136-17 | 20.6 | 34.06** | 22.8 | 12.50 | 10.00 | STEPFAC 8182 |
| 10052136-18 | 20.6 | 34.06** | 22.8 | 12.50 | 10.00 | STEPFAC 8182 |
| 10052136-19 | 20.6 | 34.06** | 16.8 | 12.50 | 16.00 | STEPFAC 8180 |
| 10052136-20 | 20.6 | 34.06** | 16.8 | 12.50 | 16.00 | STEPFAC 8182 |
| 10052136-21 | 20.6 | 34.09 | 22.8 | 12.50 | 10.00 | SURFOM 1325 SC |

*1.47 wt. % KOH (45 wt. %) was also added to the composition
**EA Dicamba (55.19% a.e.) was used

Example 14: Preparation of Formulation ID Series 10052710

Formulations were prepared using the quantities of ingredients listed in Tables 14.1 and 14.2. When used, potassium acetate was added to the aqueous solution of ammonium glufosinate, followed by addition of EA dicamba. Various tallowamine and phosphate ester surfactants were used and were added to the mixture last.

TABLE 14.1

Formulation ID Series 10052710

| Formulation No. | Ammonium Glufosinate (97%) | EA Dicamba (55.15% a.e.) | Water | Potassium Acetate | PF 8000 | CIRRASOL G-3780A | AGNIQUE PG 8107 |
|---|---|---|---|---|---|---|---|
| 10052710-1 | 20.6 | 34.09 | 28.8 | 12.50 | 3.00 | 1.00 | — |
| 10052710-2 | 20.6 | 34.09 | 28.8 | 12.50 | 2.00 | 2.00 | — |
| 10052710-3 | 20.6 | 34.09 | 28.8 | 12.50 | 1.00 | 3.00 | — |
| 10052710-4 | 20.6 | 34.09 | 28.8 | 12.50 | — | 4.00 | — |
| 10052710-5 | 20.6 | 34.09 | 16.8 | 12.50 | 12.00 | 4.00 | — |
| 10052710-6 | 20.6 | 34.09 | 22.8 | 12.50 | 7.50 | 2.50 | — |
| 10052710-7 | 20.6 | 34.09 | 22.8 | 12.50 | 5.00 | 3.00 | 2.00 |
| 10052710-8 | 20.6 | 34.09 | 25.3 | 10.00 | 5.00 | 5.00 | — |
| 10052710-9 | 20.6 | 34.09 | 35.3 | — | 5.00 | 5.00 | — |
| 10052710-10 | 20.6 | 34.09 | 35.3 | — | 2.50 | 7.50 | — |
| 10052710-11 | 20.6 | — | 75.4 | — | 4.00 | — | — |
| 10052710-12 | 20.6 | — | 75.4 | — | 2.00 | 2.00 | — |
| 10052710-13 | 20.6 | — | 75.4 | — | — | 4.00 | — |
| 10052710-14 | 20.6 | 34.09 | 35.3 | — | 7.50 | 2.50 | — |

TABLE 14.2

Formulation ID Series 10061379

| Formulation No. | Ammonium Glufosinate (100%) | EA Dicamba (54.58% a.e.) | Water | Potassium Acetate | Surfactant | Type of Surfactant |
|---|---|---|---|---|---|---|
| 10061379-3 | 20.0 | 34.44 | 21.0 | 14.58 | 10.0 | MON 56162 Agnique PG 8107 |

Example 15: Temperature Stability

The stability of Formulation ID 10053200 series (Example 7), Formulation 10051568 ID series (Example 10), and Formulation ID 10051453 series (Example 12) at a range of temperatures (−20/20° C. freeze and thaw, −20° C., −10° C., 0° C., 20° C., 40° C. and 55° C.) over an 8-week period was measured. Results are listed and summarized in Tables 15.1 and 15.2.

TABLE 15.1

Temperature Stability of Formulation ID Series 10053200

| Time | 10053200-4 | 10053200-5 | 10053200-6 | 10053200-7 | 10053200-8 | 10053200-9 |
|---|---|---|---|---|---|---|
| 24 hours | clear liquid | clear liquid | precipitate at −20/20° C., −20° C., −10° C. and 0° C. | clear liquid | clear liquid | clear liquid |
| 1 week | clear liquid | precipitate at −20/20° C., −20° C. | precipitate at −20/20° C., −20° C., −10° C. and 0° C. | clear liquid | clear liquid | clear liquid |
| 2 weeks | clear liquid | precipitate at −20/20° C., −20° C., −10° C. | precipitate at −20/20° C., −20° C., −10° C. and 0° C. (small bottle), precipitate at RT (large jar) | clear liquid | clear liquid | clear liquid |
| 3 weeks | clear liquid | precipitate at −20/20° C., −20° C., −10° C. | precipitate at −20/20° C., −20° C., −10° C. and 0° C. (small bottle), precipitate at RT (large jar) | clear liquid | clear liquid | clear liquid |
| 4 weeks | clear liquid | precipitate at −20/20° C., −20° C., −10° C. | precipitate at −20/20° C., −20° C., −10° C. and 0° C. (small bottle), precipitate at RT (large jar) | clear liquid | clear liquid | clear liquid |

TABLE 15.1-continued

Temperature Stability of Formulation ID Series 10053200

| Time | Formulation No. | | | | | |
|---|---|---|---|---|---|---|
| | 10053200-4 | 10053200-5 | 10053200-6 | 10053200-7 | 10053200-8 | 10053200-9 |
| 5 weeks | clear liquid | precipitate at −20/20° C., −20° C., −10° C. | precipitate at −20/20° C., −20° C., −10° C. and 0° C. (small bottle), precipitate at RT (large jar) | clear liquid | clear liquid | clear liquid |
| 6 weeks | clear liquid | precipitate at −20/20° C., −20° C., −10° C. | precipitate at −20/20° C., −20° C., −10° C. and 0° C. (small bottle), precipitate at RT (large jar) | clear liquid | clear liquid | clear liquid |
| 7 weeks | clear liquid | precipitate at −20/20° C., −20° C., −10° C. | precipitate at −20/20° C., −20° C., −10° C. and 0° C. (small bottle), precipitate at RT (large jar) | crystals at 0° C. | clear liquid | clear liquid |
| 8 weeks | clear liquid | precipitate at −20/20° C., −20° C., −10° C. | precipitate at −20/20° C., −20° C., −10° C. and 0° C. (small bottle), precipitate at RT (large jar) | crystals at 0° C. | clear liquid | clear liquid |
| 11 weeks | clear liquid | precipitate at −20/20° C., −20° C., −10° C. | precipitate at −20/20° C., −20° C., −10° C. and 0° C. (small bottle), precipitate at RT (large jar) | crystals at −10° C., 0° C. | clear liquid | clear liquid |
| Summary | clear and monophasic liquid for all tested temp. | precipitate at −20/20° C., −20° C., −10° C. | precipitate at −20/20° C., −20° C., −10° C. and 0° C. (small bottle), precipitate at RT (large jar) | crystals at −10° C., 0° C. | clear and monophasic liquid for all tested temp. | clear and monophasic liquid for all tested temp. |

TABLE 15.2

Temperature Stability of Formulation ID Series 10051453 and 10051568

| Time | Formulation No. | | | | | | | |
|---|---|---|---|---|---|---|---|---|
| | 10051453-17 | 10051568-1 | 10051568-2 | 10051568-3 | 10051568-4 | 10051568-5 | 10051568-6 | 10051568-7 |
| 24 hours | clear liquid | clear liquid | clear liquid | clear liquid | clear liquid | 2-phase at −20/20° C., −20° C., −10° C., 0° C. | clear liquid | 2-phase at −20/20° C., possible at −10° C. and 0° C. |
| 1 week | clear liquid | clear liquid | clear liquid | clear liquid | clear liquid | 2-phase at −20/20° C., −20° C., −10° C., 0° C. | clear liquid | 2-phase at −20/20° C. possible at −10° C. |
| 2 weeks | clear liquid | clear liquid | clear liquid | clear liquid | clear liquid | 2-phase at −20/20° C., −20° C., −10° C., 0° C. | clear liquid | 2-phase at −20/20° C. and 0° C., cloudy at −10° C. |
| 3 weeks | clear liquid | clear liquid | clear liquid | crystals at 0° C. | clear liquid | 2-phase at −20/20° C., −20° C., −10° C., 0° C. | clear liquid | 2-phase at −20/20° C. and 0° C., cloudy at −10° C. |
| 4 weeks | clear liquid | clear liquid | clear liquid | crystals grow at 0° C. | clear liquid | 2-phase at −20/20° C., −20° C., −10° C., 0° C. | clear liquid | 2-phase at −20/20° C. and 0° C., cloudy at −20° C. and −10° C. |
| 5 weeks | clear liquid | clear liquid | clear liquid | crystals at −10° C., 0° C. | clear liquid | 2-phase at −20/20° C., −20° C., −10° C., 0° C. | clear liquid | 2-phase at −20/20° C. and 0° C., cloudy at −20° C. and −10° C. |
| 6 weeks | clear liquid | clear liquid | clear liquid | crystals grow at −10° C., 0° C. | clear liquid | 2-phase at −20/20° C., −20° C., −10° C., 0° C. | clear liquid | 2-phase at −20/20° C. and 0° C., cloudy at −20° C. and −10° C. |

TABLE 15.2-continued

Temperature Stability of Formulation ID Series 10051453 and 10051568

| Time | Formulation No. | | | | | | | |
|---|---|---|---|---|---|---|---|---|
| | 10051453-17 | 10051568-1 | 10051568-2 | 10051568-3 | 10051568-4 | 10051568-5 | 10051568-6 | 10051568-7 |
| 7 week | clear liquid | clear liquid | clear liquid | crystals grow at −10° C., 0° C. | clear liquid | 2-phase at −20/20° C., −20° C., −10° C., 0° C. | clear liquid | 2-phase at −20/20° C. and 0° C., cloudy at −20° C. and −10° C. |
| 8 weeks | clear liquid | clear liquid | clear liquid | crystals grow at −10° C., 0° C. | clear liquid | 2-phase at −20/20° C., −20° C., −10° C., 0° C. | clear liquid | 2-phase at −20/20° C. and 0° C., cloudy at −20° C. and −10° C. |
| Summary | clear and monophasic liquid for all tested temp. | clear and monophasic liquid for all tested temp. | clear and monophasic liquid for all tested temp. | crystallize and grow at −10° C. and 0° C. | clear and monophasic liquid for all tested temp. | phase separation at −20/20° C., −20° C., −10° C., 0° C. | clear and monophasic liquid for all tested temp. | not monophasic at −20/20° C., −20° C., −10° C., and 0° C. |

Example 16: Greenhouse Efficacy (GE)

Formulations were studied in Velvetleaf (ABUTH) and Goosegrass (ELEIN) at targeted field rates of 0.5× and 1× as depicted in Table 16.1 to 16.8. The targeted field rates were 595 g/ha a.i. for glufosinate (1×) and 560 g/ha a.e. for dicamba (1×), or 298 g/ha a.i. for glufosinate (0.5×) and 280 g/ha a.e for dicamba (0.5×). Treatments were applied to 10-15 cm velvetleaf (ABUTH) and goosegrass (ELEIN) in greenhouse under standard conditions. Applications were made with a track sprayer at 15 GPA with a TTI nozzle (110015). Visual weed control evaluations were taken 21 days after treatment.

GE Study 1: Table 16.1 shows POST weed efficacy data of selected glufosinate and dicamba formulations. The results show very little separation between experimental formulations for ABUTH at 0.5× application rates. All formulations performed statistically equivalent to the tank mix of LIBERTY and XTENDIMAX (~75%) except formulation 10050681-11 which had slightly lower activity (65%). At the high application rate (1×), formulation 10050629-15 was the most efficacious formulation with control of 89% followed by formulation 10050681-3 (84%). The tank mix of LIBERTY and XTENDIMAX had 77% control. The results show that for ELEIN, the data was variable with low levels of control at both application rates. No significant differences were detected across all treatments. At the 1× application rate, LIBERTY alone had the highest numerical level of control at ~40%.

TABLE 16.1

GE Study 1-Weed Control of Glufosinate + Dicamba Formulations

| Formulation | Amount | Rate (g a.e./ha) | % control ABUTH | % control ELEIN |
|---|---|---|---|---|
| LIBERTY | 24.5 | 298 | 12.5 | 15.0 |
| LIBERTY | 24.5 | 595 | 32.5 | 39.2 |
| XTENDIMAX | 29 | 280 | 65.8 | 0.0 |
| XTENDIMAX | 29 | 560 | 74.2 | 0.0 |
| LIBERTY + XTENDIMAX | 24.5 + 29 | 298 + 280 | 75.8 | 13.3 |
| LIBERTY + XTENDIMAX | 24.5 + 29 | 595 + 560 | 76.7 | 25.0 |
| 10049325-3 | 20 + 18.8 | 298 + 280 | 74.2 | 6.7 |
| 10049325-3 | 20 + 18.8 | 595 + 560 | 76.7 | 22.5 |
| 10050629-10 | 20 + 18.8 | 298 + 280 | 77.5 | 16.7 |
| 10050629-10 | 20 + 18.8 | 595 + 560 | 79.2 | 23.3 |

TABLE 16.1-continued

GE Study 1-Weed Control of Glufosinate + Dicamba Formulations

| Formulation | Amount | Rate (g a.e./ha) | % control ABUTH | % control ELEIN |
|---|---|---|---|---|
| 10050629-11 | 20 + 18.8 | 298 + 280 | 72.5 | 20.0 |
| 10050629-11 | 20 + 18.8 | 595 + 560 | 79.2 | 27.5 |
| 10050629-13 | 20 + 18.8 | 298 + 280 | 75.8 | 15.0 |
| 10050629-13 | 20 + 18.8 | 595 + 560 | 80.8 | 20.8 |
| 10050629-14 | 20 + 18.8 | 298 + 280 | 74.2 | 13.3 |
| 10050629-14 | 20 + 18.8 | 595 + 560 | 80.0 | 21.7 |
| 10050629-15 | 20 + 18.8 | 298 + 280 | 74.2 | 11.7 |
| 10050629-15 | 20 + 18.8 | 595 + 560 | 88.8 | 16.7 |
| 10050681-3 | 20 + 18.8 | 298 + 280 | 75.0 | 11.7 |
| 10050681-3 | 20 + 18.8 | 595 + 560 | 84.2 | 21.7 |
| 10050681-11 | 20 + 18.8 | 298 + 280 | 65.0 | 15.0 |
| 10050681-11 | 20 + 18.8 | 595 + 560 | 80.5 | 25.0 |
| Untreated Check | 0 | 0 | 0.0 | 0.0 |

GE Study 2: Table 16.2 depicts POST weed efficacy data of selected glufosinate and dicamba formulations. The results show that for ABUTH, all experimental formulations at 0.5× application rate were statistically equivalent to the tank mix of LIBERTY and XTENDIMAX (83%). At the higher application rate (1×), only one formulation (formulation 10050681-11 with 91% control) was significantly more efficacious than the tank mix (83% control). All other formulations were statistically equivalent. The results show that for ELEIN, at 0.5× application rate, the tank mix of LIBERTY and XTENDIMAX had only 12% control, and only two experimental formulations showed efficacy (formulation 10051674-4 with 35% control and formulation 10050681-12 with 41% control). All other formulations had little to no efficacy. At the higher application rate (1×), the tank mix had 84% control. Five formulations were statistically equivalent to the tank mix: formulation 10051453-19 with 83% control, formulation 10051453-16 with 97%, formulation 10051674-4 with 95%, formulation 0050681-11 with 78%, and formulation 10050681-12 with 89%. All other formulations were less efficacious than the tank mix, with efficacy ranging from 20-60% control.

TABLE 16.2

GE Study 2 - Weed Control of Glufosinate + Dicamba Formulations

| Formulation | Amount | Rate (g a.e./ha) | % control ABUTH | % control ELEIN |
|---|---|---|---|---|
| LIBERTY | 24.5 | 298 | 15.0 | 8.3 |
| LIBERTY | 24.5 | 595 | 50.0 | 87.5 |
| XTENDIMAX | 29 | 280 | 80.8 | 0.0 |
| XTENDIMAX | 29 | 560 | 89.2 | 0.0 |
| LIBERTY + XTENDIMAX | 24.5 + 29 | 298 + 280 | 82.5 | 12.5 |
| LIBERTY + XTENDIMAX | 24.5 + 29 | 595 + 560 | 82.5 | 83.8 |
| 10050629-15 | 20 + 18.8 | 298 + 280 | 83.3 | 0.0 |
| 10050629-15 | 20 + 18.8 | 595 + 560 | 84.2 | 36.7 |
| 10051453-20 | 20 + 18.8 | 298 + 280 | 83.3 | 3.3 |
| 10051453-20 | 20 + 18.8 | 595 + 560 | 89.2 | 48.3 |
| 10050629-10 | 20 + 18.8 | 298 + 280 | 81.7 | 1.7 |
| 10050629-10 | 20 + 18.8 | 595 + 560 | 78.3 | 20.5 |
| 10051453-8 | 20 + 18.8 | 298 + 280 | 82.5 | 0.0 |
| 10051453-8 | 20 + 18.8 | 595 + 560 | 84.2 | 53.3 |
| 10051674-1 | 20 + 18.8 | 298 + 280 | 84.2 | 0.0 |
| 10051674-1 | 20 + 18.8 | 595 + 560 | 85.8 | 58.3 |
| 10051453-18 | 20 + 18.8 | 298 + 280 | 85.8 | 1.7 |
| 10051453-18 | 20 + 18.8 | 595 + 560 | 89.2 | 26.7 |
| 10051453-19 | 20 + 18.8 | 298 + 280 | 84.2 | 3.3 |
| 10051453-19 | 20 + 18.8 | 595 + 560 | 81.7 | 82.5 |
| 10051453-16 | 20 + 18.8 | 298 + 280 | 83.3 | 5.8 |
| 10051453-16 | 20 + 18.8 | 595 + 560 | 86.7 | 96.7 |
| 10051674-4 | 20 + 18.8 | 298 + 280 | 80.0 | 35.0 |
| 10051674-4 | 20 + 18.8 | 595 + 560 | 88.3 | 95.0 |
| 10050681-11 | 20 + 18.8 | 298 + 280 | 86.7 | 8.3 |
| 10050681-11 | 20 + 18.8 | 595 + 560 | 91.3 | 78.3 |
| 10050681-12 | 20 + 18.8 | 298 + 280 | 85.0 | 40.8 |
| 10050681-12 | 20 + 18.8 | 595 + 560 | 89.2 | 89.2 |
| Untreated Check | 0 | 0 | 0.0 | 0.0 |

GE Study 3: Table 16.3 depicts POST weed efficacy data of selected glufosinate and dicamba formulations. The results show that for ABUTH, all experimental formulations at a 0.5× application rate were statistically equivalent to the tank mix of LIBERTY and XTENDIMAX (87% control). At the higher application rate (1×), some formulations (formulations 10052136-4, 10052710-9, 10052710-10, 10052710-7, and 10052136-5 with 95% control) were as efficacious as the tank mix (95% control). All other formulations were slightly less efficacious. The results show that for ELEIN, the tank mix of LIBERTY and XTENDIMAX at a 0.5× application rate had only 28% control, and all experimental formulations showed little to no efficacy. At the higher application rate (1×), the tank mix had 67% control. Two formulations were slightly less efficacious than the tank mix: formulation 10051568-6 with 63% control and formulation 10052136-3 with 61% control. Two formulations (formulations 10052710-3 and 10052710-7) were statistically equivalent to the tank mix. Formulations 10052136-5 and 10052710-14 performed marginally better at 71% control and 70% control, respectively, compared to the tank mix (67% control). Two formulations performed significantly better (formulations 10052719-9 and 10052710-10) at 96% control and 82% control, respectively, than the tank mix (67% control). All other formulations were less efficacious than the tank mix.

TABLE 16.3

GE Study 3 - Weed Control of Glufosinate + Dicamba Formulations

| Formulation | Amount | Rate (g a.e./ha) | % control ABUTH | % control ELEIN |
|---|---|---|---|---|
| LIBERTY | 24.5 | 298 | 9.2 | 54.2 |
| LIBERTY | 24.5 | 595 | 69.2 | 95.8 |
| XTENDIMAX | 29 | 280 | 83.3 | 0.0 |
| XTENDIMAX | 29 | 560 | 90.0 | 0.0 |
| LIBERTY + XTENDIMAX | 24.5 + 29 | 298 + 280 | 87.5 | 28.3 |
| LIBERTY + XTENDIMAX | 24.5 + 29 | 595 + 560 | 96.7 | 67.5 |
| 100551568-6 | 20 + 18.8 | 298 + 280 | 90.0 | 8.3 |
| 100551568-6 | 20 + 18.8 | 595 + 560 | 93.3 | 63.3 |
| 10052136-3 | 20 + 18.8 | 298 + 280 | 87.5 | 0.0 |
| 10052136-3 | 20 + 18.8 | 595 + 560 | 90.8 | 60.8 |
| 10052710-1 | 20 + 18.8 | 298 + 280 | 90.0 | 0.0 |
| 10052710-1 | 20 + 18.8 | 595 + 560 | 90.0 | 28.3 |
| 10052710-2 | 20 + 18.8 | 298 + 280 | 90.8 | 4.2 |
| 10052710-2 | 20 + 18.8 | 595 + 560 | 90.8 | 31.7 |
| 10052710-3 | 20 + 18.8 | 298 + 280 | 89.2 | 5.0 |
| 10052710-3 | 20 + 18.8 | 595 + 560 | 90.8 | 67.5 |
| 10052136-4 | 20 + 18.8 | 298 + 280 | 88.3 | 4.2 |
| 10052136-4 | 20 + 18.8 | 595 + 560 | 94.7 | 40.0 |
| 10052710-14 | 20 + 18.8 | 298 + 280 | 90.0 | 5.0 |
| 10052710-14 | 20 + 18.8 | 595 + 560 | 91.7 | 69.8 |
| 10052710-9 | 20 + 18.8 | 298 + 280 | 92.5 | 6.7 |
| 10052710-9 | 20 + 18.8 | 595 + 560 | 95.5 | 96.3 |
| 10052710-10 | 20 + 18.8 | 298 + 280 | 90.8 | 8.3 |
| 10052710-10 | 20 + 18.8 | 595 + 560 | 96.3 | 83.3 |
| 10052710-7 | 20 + 18.8 | 298 + 280 | 90.8 | 3.3 |
| 10052710-7 | 20 + 18.8 | 595 + 560 | 94.7 | 69.2 |
| 10052136-5 | 20 + 18.8 | 298 + 280 | 90.0 | 3.3 |
| 10052136-5 | 20 + 18.8 | 595 + 560 | 96.8 | 71.7 |
| Untreated Check | 0 | 0 | 0.0 | 0.0 |

GE Study 4: Table 16.4 depicts a study to determine effective surfactants for POST weed efficacy of selected glufosinate and dicamba formulations. The results show that in ABUTH, across both rates, t-test analysis shows all seven experimental formulations tested were statistically equivalent to the tank mix of LIBERTY and XTENDIMAX. The results show that in ELEIN, at the 0.5× rate, three formulations were statistically equivalent to the LIBERTY and XTENDIMAX tank mix. Those include formulation 10053200-4 (surfactant: AGNIQUE PG8107 at 10%), formulation 10053200-5 (surfactant: AGNIQUE PG8107 at 16%), and formulation 10053200-6 (surfactant: AL-2559 at 16%). All other experimental formulations were less efficacious. At the 1× application rate, three formulations were statistically equivalent to the LIBERTY and XTENDIMAX tank mix. Those include formulation 10053200-3 (surfactant: ADSEE C80W at 4%), formulation 10053200-4 (surfactant: AGNIQUE PG8107 at 10%), and formulation 10053200-5 (surfactant: AGNIQUE PG8107 at 16%). All other experimental formulations were less efficacious.

Overall, based on a t-test analysis across both species and rates, four formulations were statistically equivalent to the tank mix of LIBERTY and XTENDIMAX. Formulation 10053200-5 (surfactant: AGNIQUE PG8107 at 16%), formulation 10053200-4 (surfactant: AGNIQUE PG8107 at 10%), formulation 10053200-7 (surfactant: ADSEE C80W at 6% and AGNIQUE PG8107 at 4%), and formulation 10053200-3 (surfactant: ADSEE C80W at 4%). The other three experimental formulations tested were significantly less efficacious than the tank mix.

TABLE 16.4

GE Study 4 - Weed Control of Glufosinate + Dicamba Formulations

| Formulation | Amount | Rate (g a.e./ha) | % control ABUTH | % control ELEIN |
|---|---|---|---|---|
| LIBERTY | 24.5 | 298 | 23.3 | 46.7 |
| LIBERTY | 24.5 | 595 | 66.7 | 78.3 |
| XTENDIMAX | 29 | 280 | 75.0 | 0.0 |
| XTENDIMAX | 29 | 560 | 85.8 | 0.0 |
| LIBERTY + XTENDIMAX | 24.5 + 29 | 298 + 280 | 80.0 | 29.2 |
| LIBERTY + XTENDIMAX | 24.5 + 29 | 595 + 560 | 89.7 | 65.0 |
| 10053200-1 | 20 + 18.8 | 298 + 280 | 89.2 | 7.5 |
| 10053200-1 | 20 + 18.8 | 595 + 560 | 85.0 | 28.3 |
| 10053200-2 | 20 + 18.8 | 298 + 280 | 89.2 | 20.8 |
| 10053200-2 | 20 + 18.8 | 595 + 560 | 86.7 | 32.5 |
| 10053200-3 | 20 + 18.8 | 298 + 280 | 83.3 | 16.7 |
| 10053200-3 | 20 + 18.8 | 595 + 560 | 85.8 | 55.0 |
| 10053200-4 | 20 + 18.8 | 298 + 280 | 85.8 | 24.2 |
| 10053200-4 | 20 + 18.8 | 595 + 560 | 87.0 | 52.5 |
| 10053200-5 | 20 + 18.8 | 298 + 280 | 80.0 | 27.5 |
| 10053200-5 | 20 + 18.8 | 595 + 560 | 89.2 | 60.0 |
| 10053200-6 | 20 + 18.8 | 298 + 280 | 86.7 | 23.3 |
| 10053200-6 | 20 + 18.8 | 595 + 560 | 85.8 | 36.7 |
| 10053200-7 | 20 + 18.8 | 298 + 280 | 87.5 | 17.5 |
| 10053200-7 | 20 + 18.8 | 595 + 560 | 91.0 | 48.3 |

GE Study 5: Table 16.5 shows that for ABUTH, most experimental formulations at the 0.5× application rate were statistically equivalent to the tank mix of LIBERTY and XTENDIMAX (88% control), and some formulations (formulation 10052136-3 with 82% control and formulation 10052710-2 with 82%) were slightly less efficacious. At the higher application rate (1×), formulation 10051568-6 was as efficacious as the tank mix (90% control). Formulations 10052710-2 (93% control), 10052719-3 (91% control), 10052136-4 (91% control), 10052710-7 (93% control), and 10052136-5 (97% control) performed slightly better than the tank mix (90% control). All other formulations were slightly less efficacious. Table 16.5 also shows that for ELEIN, the tank mix of LIBERTY and XTENDIMAX at 0.5× application rate had only 4% control, and all experimental formulations showed little to no efficacy. At the higher rate (1×), the tank mix had 17% control. Formulation 10052710-10 showed about 12% control. All other formulations showed little to no control (<10%).

TABLE 16.5

GE Study 5 - Weed Control of Glufosinate + Dicamba Formulations

| Formulation | Amount | Rate (g a.e./ha) | % control ABUTH | % control ELEIN |
|---|---|---|---|---|
| LIBERTY | 24.5 | 298 | 0.0 | 5.8 |
| LIBERTY | 24.5 | 595 | 47.5 | 30.0 |
| XTENDIMAX | 29 | 280 | 80.0 | 0.0 |
| XTENDIMAX | 29 | 560 | 86.7 | 0.0 |
| LIBERTY + XTENDIMAX | 24.5 + 29 | 298 + 280 | 88.3 | 4.2 |
| LIBERTY + XTENDIMAX | 24.5 + 29 | 595 + 560 | 90.0 | 16.7 |
| 100551568-6 | 20 + 18.8 | 298 + 280 | 88.3 | 0.0 |
| 100551568-6 | 20 + 18.8 | 595 + 560 | 90.0 | 5.0 |
| 10052136-3 | 20 + 18.8 | 298 + 280 | 82.5 | 0.0 |
| 10052136-3 | 20 + 18.8 | 595 + 560 | 86.7 | 5.0 |
| 10052710-1 | 20 + 18.8 | 298 + 280 | 85.0 | 0.0 |
| 10052710-1 | 20 + 18.8 | 595 + 560 | 88.3 | 3.3 |
| 10052710-2 | 20 + 18.8 | 298 + 280 | 85.8 | 0.0 |
| 10052710-2 | 20 + 18.8 | 595 + 560 | 94.3 | 5.0 |
| 10052710-3 | 20 + 18.8 | 298 + 280 | 85.8 | 0.0 |
| 10052710-3 | 20 + 18.8 | 595 + 560 | 91.7 | 1.7 |
| 10052136-4 | 20 + 18.8 | 298 + 280 | 85.8 | 0.0 |
| 10052136-4 | 20 + 18.8 | 595 + 560 | 91.7 | 3.3 |
| 10052710-14 | 20 + 18.8 | 298 + 280 | 87.5 | 3.3 |
| 10052710-14 | 20 + 18.8 | 595 + 560 | 87.5 | 1.7 |
| 10052710-9 | 20 + 18.8 | 298 + 280 | 82.5 | 0.0 |
| 10052710-9 | 20 + 18.8 | 595 + 560 | 86.7 | 6.7 |
| 10052710-10 | 20 + 18.8 | 298 + 280 | 86.7 | 3.3 |
| 10052710-10 | 20 + 18.8 | 595 + 560 | 85.0 | 13.3 |
| 10052710-7 | 20 + 18.8 | 298 + 280 | 89.2 | 0.0 |
| 10052710-7 | 20 + 18.8 | 595 + 560 | 93.3 | 10.0 |
| 10052136-5 | 20 + 18.8 | 298 + 280 | 91.7 | 0.0 |
| 10052136-5 | 20 + 18.8 | 595 + 560 | 97.2 | 4.2 |
| Untreated Check | 0 | 0 | 0.0 | 0.0 |

TABLE 16.6

GE Study 6 - Weed Control of Glufosinate + Dicamba Formulations

| Formulation | Amount | Rate (g a.e./ha) | % control ABUTH | % control ELEIN |
|---|---|---|---|---|
| LIBERTY | 24.5 | 298 | 8 | 2 |
| LIBERTY | 24.5 | 595 | 51 | 6 |
| XTENDIMAX | 29 | 280 | 90 | 0 |
| XTENDIMAX | 29 | 560 | 91 | 0 |
| LIBERTY + XTENDIMAX | 24.5 + 29 | 298 + 280 | 80 | 0 |
| LIBERTY + XTENDIMAX | 24.5 + 29 | 595 + 560 | 96 | 0 |
| 10053726-1 | 20 + 18.8 | 298 + 280 | 84 | 0 |
| 10053726-1 | 20 + 18.8 | 595 + 560 | 90 | 0 |
| 10053726-2 | 20 + 18.8 | 298 + 280 | 91 | 0 |
| 10053726-2 | 20 + 18.8 | 595 + 560 | 86 | 0 |
| 10053726-3 | 20 + 18.8 | 298 + 280 | 90 | 0 |
| 10053726-3 | 20 + 18.8 | 595 + 560 | 81 | 0 |
| 10053726-4 | 20 + 18.8 | 298 + 280 | 91 | 0 |
| 10053726-4 | 20 + 18.8 | 595 + 560 | 85 | 0 |
| 10053726-5 | 20 + 18.8 | 298 + 280 | 88 | 0 |
| 10053726-5 | 20 + 18.8 | 595 + 560 | 90 | 0 |
| 10053726-6 | 20 + 18.8 | 298 + 280 | 87 | 0 |
| 10053726-6 | 20 + 18.8 | 595 + 560 | 87 | 0 |
| 10053726-7 | 20 + 18.8 | 298 + 280 | 85 | 0 |
| 10053726-7 | 20 + 18.8 | 595 + 560 | 87 | 0 |
| 10053726-8 | 20 + 18.8 | 298 + 280 | 90 | 0 |
| 10053726-8 | 20 + 18.8 | 595 + 560 | 86 | 0 |
| 10053726-9 | 20 + 18.8 | 298 + 280 | 90.6 | 0 |
| 10053726-9 | 20 + 18.8 | 595 + 560 | 86 | 0 |
| 10053726-10 | 20 + 18.8 | 298 + 280 | 88.6 | 0 |
| 10053726-10 | 20 + 18.8 | 595 + 560 | 87 | 0 |
| 10053726-11 | 20 + 18.8 | 298 + 280 | 89.4 | 0 |
| 10053726-11 | 20 + 18.8 | 595 + 560 | 84 | 0 |
| 10053726-12 | 20 + 18.8 | 298 + 280 | 85 | 0 |
| 10053726-12 | 20 + 18.8 | 595 + 560 | 87 | 0 |
| 10053726-13 | 20 + 18.8 | 298 + 280 | 87 | 0 |
| 10053726-13 | 20 + 18.8 | 595 + 560 | 89.6 | 0 |
| 10053726-14 | 20 + 18.8 | 298 + 280 | 90 | 0 |
| 10053726-14 | 20 + 18.8 | 595 + 560 | 84.4 | 0 |
| 10053726-15 | 20 + 18.8 | 298 + 280 | 89 | 0 |
| 10053726-15 | 20 + 18.8 | 595 + 560 | 81 | 0 |
| Untreated Check | | | 0 | 0 |

TABLE 16.7

POST weed efficacy of selected glufosinate and dicamba formulations

| Formulation | Amount | Rate (g a.e./ha) | % control ABUTH | % control ELEIN |
|---|---|---|---|---|
| LIBERTY | 24.5 | 298 | 21.7 | 15.0 |
| LIBERTY | 24.5 | 595 | 51.7 | 71.7 |
| XTENDIMAX | 29 | 280 | 85.8 | 0.0 |
| XTENDIMAX | 29 | 560 | 90.0 | 0.0 |
| LIBERTY + XTENDIMAX | 24.5 + 29 | 298 + 280 | 83.3 | 10.0 |
| LIBERTY + XTENDIMAX | 24.5 + 29 | 595 + 560 | 88.3 | 65.0 |
| 10053726-16 | 20 + 18.8 | 298 + 280 | 79.2 | 0.0 |
| 10053726-16 | 20 + 18.8 | 595 + 560 | 85.0 | 0.0 |
| 10053726-17 | 20 + 18.8 | 298 + 280 | 85.8 | 0.0 |
| 10053726-17 | 20 + 18.8 | 595 + 560 | 90.0 | 0.0 |
| 10053726-22 | 20 + 18.8 | 298 + 280 | 87.5 | 0.0 |
| 10053726-22 | 20 + 18.8 | 595 + 560 | 92.5 | 3.3 |
| 10053726-23 | 20 + 18.8 | 298 + 280 | 93.7 | 0.0 |
| 10053726-23 | 20 + 18.8 | 595 + 560 | 91.0 | 0.0 |
| 10053726-18 | 20 + 18.8 | 298 + 280 | 90.8 | 0.0 |
| 10053726-18 | 20 + 18.8 | 595 + 560 | 89.2 | 15.0 |
| 10053726-19 | 20 + 18.8 | 298 + 280 | 85.0 | 0.0 |
| 10053726-19 | 20 + 18.8 | 595 + 560 | 84.2 | 7.5 |
| 10053726-24 | 20 + 18.8 | 298 + 280 | 86.7 | 0.0 |
| 10053726-24 | 20 + 18.8 | 595 + 560 | 90.3 | 23.3 |
| 10053726-25 | 20 + 18.8 | 298 + 280 | 90.0 | 0.0 |
| 10053726-25 | 20 + 18.8 | 595 + 560 | 84.2 | 37.5 |
| 10053726-20 | 20 + 18.8 | 298 + 280 | 87.5 | 3.3 |
| 10053726-20 | 20 + 18.8 | 595 + 560 | 88.8 | 30.0 |
| 10053726-21 | 20 + 18.8 | 298 + 280 | 85.0 | 3.3 |
| 10053726-21 | 20 + 18.8 | 595 + 560 | 84.2 | 51.7 |
| 10053726-26 | 20 + 18.8 | 298 + 280 | 89.2 | 7.5 |
| 10053726-26 | 20 + 18.8 | 595 + 560 | 85.8 | 56.7 |
| 10053726-27 | 20 + 18.8 | 298 + 280 | 84.2 | 15.0 |
| 10053726-27 | 20 + 18.8 | 595 + 560 | 90.8 | 70.8 |
| Untreated Check | | | 0 | 0 |

GE Study 8: Control of Palmer amaranth (AMAPA) and Proso millet (PANMI) was measured.

TABLE 16.8

GE Study 8 - Weed Control of Glufosinate + Dicamba Formulations

| Formulation | Amount | Rate (g a.e./ha) | % control AMAPA | % control PANMI |
|---|---|---|---|---|
| LIBERTY | 24.5 | 298 | 100.0 | 73.3 |
| LIBERTY | 24.5 | 595 | 100.0 | 95.8 |
| XTENDIMAX | 29 | 280 | 95.0 | 0.0 |
| XTENDIMAX | 29 | 560 | 99.2 | 0.0 |
| LIBERTY + XTENDIMAX | 24.5 + 29 | 298 + 280 | 99.7 | 82.7 |
| LIBERTY + XTENDIMAX | 24.5 + 29 | 595 + 560 | 100.0 | 91.7 |
| 10053200-1 | 20 + 18.8 | 298 + 280 | 99.5 | 49.2 |
| 10053200-1 | 20 + 18.8 | 595 + 560 | 100.0 | 71.7 |
| 10053200-2 | 20 + 18.8 | 298 + 280 | 95.2 | 50.0 |
| 10053200-2 | 20 + 18.8 | 595 + 560 | 100.0 | 92.5 |
| 10053200-3 | 20 + 18.8 | 298 + 280 | 89.5 | 64.2 |
| 10053200-3 | 20 + 18.8 | 595 + 560 | 100.0 | 100.0 |
| 10053200-4 | 20 + 18.8 | 298 + 280 | 92.2 | 55.0 |
| 10053200-4 | 20 + 18.8 | 595 + 560 | 100.0 | 95.0 |
| 10053200-5 | 20 + 18.8 | 298 + 280 | 95.3 | 74.2 |
| 10053200-5 | 20 + 18.8 | 595 + 560 | 100.0 | 94.2 |
| 10053200-6 | 20 + 18.8 | 298 + 280 | 87.5 | 60.0 |
| 10053200-6 | 20 + 18.8 | 595 + 560 | 100.0 | 92.5 |
| 10053200-7 | 20 + 18.8 | 298 + 280 | 95.0 | 63.3 |
| 10053200-7 | 20 + 18.8 | 595 + 560 | 100.0 | 100.0 |
| Untreated Check | | | 0 | 0 |

Example 17: Humidome Volatility

Volatility of an auxin herbicide from an application solution is measured in accordance with the procedure described in "A Method to Determine the Relative Volatility of Auxin Herbicide Formulations" in ASTM publication STP1587 entitled "Pesticide Formulation and Delivery Systems: 35th Volume, Pesticide Formulations, Adjuvants, and Spray Characterization in 2014," published 2016, which is incorporated herein by reference. The general procedure is described briefly below.

Humidomes obtained from Hummert International (Part Nos 14-3850-2 for humidomes and 11-3050-1 for 1020 flat tray) were modified by cutting a 2.2 cm diameter hole on one end approximately 5 cm from the top to allow for insertion of a glass air sampling tube (22 mm OD) containing a polyurethane foam (PUF) filter. The sampling tube was secured with a VITON o-ring on each side of the humidome wall. The air sampling tube external to the humidome was fitted with tubing that was connected to a vacuum manifold immediately prior to sampling.

The flat tray beneath the humidome was filled with 1 liter of sifted dry or wet 50/50 soil (50% Redi-Earth and 50% US 10 Field Soil) to a depth of about 1 cm. Spray solutions of each formulation were prepared to contain 1.2% a.e. of total auxin herbicide, which is equivalent to an application rate of 1.0 lb/A a.e. at 10 gallons per acre (GPA), and then sprayed onto the soil of each humidome. Four separate humidome boxes were sprayed to have four replicate measurements for each formulation.

The flat tray bottom containing the auxin herbicide formulation on soil was covered with the humidome lid and the lid was secured with clamps. The growth chambers were set at 35° C. and 40% relative humidity (RH). The assembled humidomes were placed in a temperature and humidity controlled environment and connected to a vacuum manifold through the air sampling line. Air was drawn through the humidome and PUF at a rate of 2 liters per minute (LPM) for 24 hours at which point the air sampling was stopped. The humidomes were then removed from the controlled environment and the PUF filter was removed. The PUF filter was extracted with 20 mL of methanol and the solution was analyzed for the auxin herbicide concentration using LC-MS methods known in the art.

The results are tabulated in Table 17. All formulations were diluted to 1.2% a.e. dicamba prior to testing unless indicated otherwise.

TABLE 17

Humidome Volatility Test of EA Dicamba-Glufosinate Premixes on Sprayed Soil at 35° C.

| Formulation | pH | Dicamba in Air (ng/L) |
|---|---|---|
| 1.2% a.e. CLARITY | 6.07 | 0.233 |
| 1.2% a.e. XTENDIMAX + 1.3% a.i. LIBERTY | 5.39 | 5.287 |
| 1.2% a.e. XTENDIMAX + 1.3% a.i. NH$_4$ Glufosinate | 5.31 | 4.975 |
| 10049286-1 | 6.06 | 2.018 |
| 10049325-1 | 6.03 | 12.833 |
| 10049325-2 | 6.75 | 0.165 |
| 10049325-3 | — | 0.278 |
| 10050681-2 | 6.82 | 6.370 |
| 10050681-5 | 6.76 | 12.167 |
| 10050681-11 | 6.88 | 0.147 |
| 10051483-1 | 6.83 | 3.686 |
| 10051483-2 | 6.89 | 0.695 |
| 10050629-10 | 6.90 | 0.124 |

TABLE 17-continued

Humidome Volatility Test of EA Dicamba-Glufosinate Premixes on Sprayed Soil at 35° C.

| Formulation | pH | Dicamba in Air (ng/L) |
|---|---|---|
| 10050629-13 | 6.92 | 0.164 |
| 10051568-3 | 8.06 | 0.073 |
| 10051568-4 | 6.95 | 0.119 |
| 10051568-6 | 6.82 | 0.085 |
| 10051453-9 | 6.56 | 0.088 |
| 10051674-2 | 4.96 | 1.810 |
| 10053200-1 | 6.79 | 0.123 |
| 10053200-2 | 6.80 | 0.064 |
| 10053200-3 | 8.02 | 0.067 |
| 10053200-4 | 6.87 | 0.107 |
| 10053200-5 | 6.89 | 0.059 |
| 10053200-6 | 6.86 | 0.077 |

Example 18: Spray Particle Size Evaluation

The spray particle size distribution of tank mixtures prepared from the formulations of the present invention was measured by light scattering. This technique passes a visible laser through the droplets and measures scattering, from which the distribution of droplet sizes in the spray can be determined. The measurement was performed by mounting the nozzle on a track and traversing the nozzle during the measurement so that the entire spray pattern was sampled nine times during each measurement. The spray was directed into a tray from which it was recirculated to the nozzle. No wind tunnel was used. The particle size distribution was measured with a Malvern SPRAYTEC which uses a He-Ne laser. The Malvern software integrates and weights the data to provide an overall particle size distribution for the complete spray fan and calculates the "derived parameters" which characterize the spray. The key derived parameters are the volume-weighted mean droplet diameter (Dv50) and the fraction of driftable fine particles. Several definitions of driftable fines are used. In the examples which follow, the driftable fines are quantified as the volume percent of the spray with a diameter less than 150 µm.

Six different premixes of dicamba and glufosinate having 18.8% a.e. dicamba, 20.0% a.i. ammonium glufosinate, 12.5% potassium acetate, and various surfactants were evaluated to determine particle size. The formulations were tested using '04 nozzles at 63 psi, corresponding to 12.4 gallons per acre for a 12 mph sprayer speed. Twelve liters of tank mix was produced for a 560 g a.e./ha dicamba spray mixture, corresponding to 596 g a.i/ha glufosinate (545 g/ha a.e.). Results are described in Tables 18.1-18.3.

TABLE 18.1

Loadings using DR-04 nozzle

| Formulation | Surfactant | % vol < 150 µm | Dv50 (µm) |
|---|---|---|---|
| XTENDIMAX + LIBERTY | N/A | 11.83 ± .19 | 441.80 ± 1.77 |
| 10053200-1 | 4% WITCOLATE 7093 | 5.40 ± .12 | 533.62 ± 5.62 |
| 10053200-2 | 4% C-6178 | 3.91 ± .14 | 545.71 ± 19.18 |
| 10053200-3 | 4% ADSEE C80W | 5.26 ± 0.16 | 491.09 ± 1.43 |
| 10053200-4 | 10% AGNIQUE PG 8107 | 9.67 ± .14 | 440.58 ± 1.82 |
| 10053200-5 | 16% AGNIQUE PG 8107 | 10.81 ± .17 | 459.09 ± 3.91 |
| 10053200-6 | 16% AL-2559 | 3.96 ± .16 | 471.98 ± 2.81 |

TABLE 18.2

Loadings using TDXL-04 nozzle

| Formulation | Surfactant | % vol < 150 µm | Dv50 (µm) |
|---|---|---|---|
| XTENDIMAX + LIBERTY | N/A | 19.35 ± 0.55 | 334.06 ± 13.56 |
| 10053200-1 | 4% WITCOLATE 7093 | 7.19 ± 0.12 | 460.38 ± 3.12 |
| 10053200-2 | 4% C-6178 | 4.37 ± 0.09 | 489.67 ± 1.15 |
| 10053200-3 | 4% ADSEE C80W | 6.35 ± 0.43 | 442.24 ± 5.01 |
| 10053200-4 | 10% AGNIQUE PG 8107 | 12.20 ± 0.41 | 387.24 ± 4.26 |
| 10053200-5 | 16% AGNIQUE PG 8107 | 20.05 ± 0.43 | 340.30 ± 3.68 |
| 10053200-6 | 16% AL-2559 | 3.65 ± 0.05 | 451.07 ± 1.79 |

TABLE 18.3

Loadings using TTI-04 nozzle

| Formulation | Surfactant | % vol < 150 µm | Dv50 (µm) |
|---|---|---|---|
| XTENDIMAX + LIBERTY | N/A | 4.53 ± 0.05 | 678.18 ± 2.52 |
| 10053200-1 | 4% WITCOLATE 7093 | 2.91 ± 0.07 | 722.67 ± 5.45 |
| 10053200-2 | 4% C-6178 | 2.64 ± 0.04 | 690.45 ± 4.21 |
| 10053200-3 | 4% ADSEE C80W | 2.72 ± 0.05 | 672.70 ± 27.42 |
| 10053200-4 | 10% AGNIQUE PG 8107 | 3.31 ± 0.06 | 667.66 ± 5.63 |
| 10053200-5 | 16% AGNIQUE PG 8107 | 4.77 ± 0.13 | 634.94 ± 4.74 |
| 10053200-6 | 16% AL-2559 | 3.47 ± 0.05 | 568.36 ± 3.27 |

Example 19: Summary of Properties of Surfactant Systems

Table 19.1 lists formulations prepared using WITCOLATE 7093 (available from Akzo Nobel), AL-2559, ADSEE C-80W, SYNPERONIC 91/6, ATPLUS 401, AND C-6178 with high concentration level of potassium acetate. Formulations using surfactant mixtures of AGNIQUE SLES-270/AL-2559 with various concentration levels of potassium acetate were prepared and tested. Monophasic formulations were achieved using AGNIQUE SLES-270 alone with low potassium acetate concentrations. Of the surfactant mixture tested, AL-2559 promoted compatibility of AGNIQUE SLES-270 with the ammonium glufosinate/EA dicamba premix and potassium acetate. Monophasic formulations have been prepared using the surfactant mixtures with high potassium acetate concentrations.

TABLE 19.1

Various Surfactants Used

| Formulation No. | Ammonium Glufosinate | MEA Dicamba | Potassium Acetate | Surfactant System | Chemical of Surfactants |
|---|---|---|---|---|---|
| 10050755 | 20% a.i. | 18.8% a.e. | 12.50% | WITCOLATE 7093 (4 wt %) | sodium C6-10 alcohol ether sulfate |
| 10050629-10 | 20% a.i. | 18.8% a.e. | 12.50% | AL-2559 (4 wt %) (CRODA) | alkylpolyglycoside |
| 10050629-11 | 20% a.i. | 18.8% a.e. | 12.50% | ADSEE C80W (4 wt %) | coco amidopropyl dimethylamine |
| 10050629-13 | 20% a.i. | 18.8% a.e. | 12.50% | SYNPERONIC 91/6 (4 wt %) | alcohols, C9-11, ethoxylated |
| 10050629-14 | 20% a.i. | 18.8% a.e. | 12.50% | ATPLUS 401 (4 wt %) | Blended sulfonate + alkoxylate |
| 10050629-15 | 20% a.i. | 18.8% a.e. | 12.50% | C6178 (4 t %) | Blended ethoxylated tallowamine + phosphate ester |
| 10050681-3 | 20% a.i. | 18.8% a.e. | 4.30% | AGNIQUE SLES-270 (4 wt %) | sodium lauryl ether sulfate |
| 10050681-11 | 20% a.i. | 18.8% a.e. | 12.50% | AGNIQUE SLES-270 (2 wt %) + AL-2559 (6 wt %) | sodium lauryl ether sulfate + alkylpolyglycoside |

Tables 19.2-19.4 group different formulations that possess similar properties. Table 19.2 shows surfactants that yield a monophasic solution; Table 19.3 shows surfactants that yield monophasic solutions with a lower monocarboxylic acid salt loading; and Table 19.4 shows biphasic surfactants.

TABLE 19.2

Surfactants yielding monophasic solution

| Ammonium Glufosinate | MEA Dicamba | Potassium Acetate | Surfactant System | Chemical of Surfactants |
|---|---|---|---|---|
| 20% a.i. | 18.8% a.e. | 12.50% | PF 8000 (4-16 wt %) | Tridecanol 4EO phosphate ester |
| 20% a.i. | 18.8% a.e. | 12.50% | PF 8000 (2 wt %) + CIRRASOL G-3780A (2 wt %) | Phosphate ester + ethoxylated tallowamine |
| 20% a.i. | 18.8% a.e. | 12.50% | PF 8000 (2-8 wt %) + CIRRASOL G-3780A (2-5 wt %) + APG (1-5 wt %) | Phosphate ester + ethoxylated tallowamine + alkylpolyglycoside |
| 20% a.i. | 18.8% a.e. | 12.50% | SURFOM 1322 SC (4, 6 wt %) (Oxiteno) | Tristylphenol EO phosphate ester, TEA salt |
| 20% a.i. | 18.8% a.e. | 12.50% | SURFOM 1325 SC (4-16 wt %) (Oxiteno) | Tristylphenol EO phosphate ester, potassium salt |
| 20% a.i. | 18.8% a.e. | 12.50% | SURFOM 1323 SC (4 wt %) (Oxiteno) | Tristylphenol EO phosphate ester, acid |
| 20% a.i. | 18.8% a.e. | 12.50% | WITCOLATE 7093 (4-16 wt %) | sodium C6-10 alcohol ether sulfate |
| 20% a.i. | 18.8% a.e. | 12.50% | SYNPERONIC 91/6 (4-16 wt %) | alcohols, C9-11, ethoxylated |
| 20% a.i. | 18.8% a.e. | 12.50% | ATPLUS 401 (4-16 wt %) | Blended sulfonate + alkoxylate |

TABLE 19.3

Surfactants yielding monophasic solutions with lower monocarboxylic acid salt loading

| Ammonium Glufosinate | MEA Dicamba | Potassium Acetate | Surfactant System | Chemical of Surfactants |
|---|---|---|---|---|
| 20% a.i. | 18.8% a.e. | 0-4.20% | AGNIQUE SLES-270 (4 wt %) | sodium lauryl ether sulfate |
| 20% a.i. | 18.8% a.e. | 0% | AGNIQUE SLES-270 (4 wt %) + APG (2 wt %) | sodium lauryl ether sulfate + alkylpolyglycoside |
| 20% a.i. | 18.8% a.e. | 8.30% | AGNIQUE SLES-270 (2 wt %) + APG (2 wt %) | sodium lauryl ether sulfate + alkylpolyglycoside |

TABLE 19.3-continued

Surfactants yielding monophasic solutions with lower monocarboxylic acid salt loading

| Ammonium Glufosinate | MEA Dicamba | Potassium Acetate | Surfactant System | Chemical of Surfactants |
|---|---|---|---|---|
| 20% a.i. | 18.8% a.e. | 0% | CIRRASOL G-3780A (2.5-7.5 wt %) + PF 8000 (2.5-7.5 wt %) (total = 10 wt %) | Phosphate ester + ethoxylated tallowamine |

TABLE 19.4

Biphasic Surfactants

| Ammonium Glufosinate | MEA Dicamba | Potassium Acetate | Surfactant System | Chemical of Surfactants |
|---|---|---|---|---|
| 20% a.i. | 18.8% a.e. | 6.25-12.50% | AGNIQUE SLES-270 (4 wt %) | sodium lauryl ether sulfate |
| 20% a.i. | 18.8% a.e. | 8.30% | AGNIQUE SLES-270 (2-4 wt %) + APG (2 wt %) | sodium lauryl ether sulfate + alkylpolyglycoside |
| 20% a.i. | 18.8% a.e. | 12.50% | C6330 (4 wt %) | Ethoxylated tallowamine + glycerol |
| 20% a.i. | 18.8% a.e. | 12.50% | CIRRASOL G-3780A/ AGNIQUE TAM-15 (4 wt %) | Ethoxylated tallowamine |
| 20% a.i. | 18.8% a.e. | 10.00-12.50% | CIRRASOL G-3780A (5-8 wt %) + PF 8000 (3-5 wt %) | Phosphate ester + ethoxylated tallowamine |
| 20% a.i. | 18.8% a.e. | 12.50% | BREAK-THRU OE 441 (4 wt %) (Evonik) | polyether siloxane |
| 20% a.i. | 18.8% a.e. | 12.50% | BREAK-THRU S240 (4 wt %) (Evonik) | polyether trisiloxane |
| 20% a.i. | 18.8% a.e. | 12.50% | AGNIQUE SLES-270 (2 wt %) + APG (6 wt %) | sodium lauryl ether sulfate + alkylpolyglycoside |
| 40% a.i. | — | — | T-MAZ 20 (5 wt %) | Ethoxylated sorbitan monolaurate (POE 20) |
| 40% a.i. | — | — | PF 8000/KLEARFAC AA 270 (5 wt %) (BASF) | Phosphate ester |
| 40% a.i. | — | — | ARLATONE T-NV (5 wt %) | Ethoxylated sorbitan ester |

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above compositions and methods without departing from the scope of the invention, it is intended that all matter contained in the above description and shown in the accompanying drawings shall be interpreted as illustrative and not in a limiting sense.

Having described the invention in detail, it will be apparent that modifications and variations are possible without departing from the scope of the invention defined in the appended claims.

What is claimed is:

1. An aqueous herbicidal concentrate composition comprising:
   a glufosinate component comprising the ammonium salt of glufosinate, wherein the concentration of the glufosinate component on an acid equivalence basis is at least about 5 wt. %;
   an auxin herbicide component comprising the monoethanolamine salt of dicamba, wherein the concentration of the auxin herbicide component on an acid equivalence basis is at least about 5 wt. %;
   a monocarboxylic acid and/or salt thereof selected from the group consisting of formic acid, acetic acid, mixtures thereof, and/or salts thereof, wherein the concentration of the monocarboxylic acid and/or salt thereof is at least about 3 wt. %; and
   a surfactant component comprising one or more alkyl ether sulfates, wherein the total concentration of the surfactant component is at least about 1 wt. %, and
   wherein the total herbicide concentration of the composition is at least about 20 wt. %.

2. The composition of claim 1, wherein the total herbicide concentration is from about 30 wt. % to about 60 wt. %.

3. The composition of claim 1, wherein the concentration of the ammonium salt of glufosinate on an acid equivalence basis is at least about 10 wt. %.

4. The composition of claim 1, wherein the concentration of the glufosinate component on an acid equivalence basis is from about 10 wt. % to about 50 wt. %.

5. The composition of claim 1, wherein the concentration of the glufosinate component on an acid equivalence basis is from about 15 wt. % to about 40 wt. %.

6. The composition of claim 1, wherein the surfactant component comprises sodium C12-15 pareth sulfate (1EO), ammonium C6-10 alcohol ether sulfate, sodium C6-10 alcohol ether sulfate, isopropylammonium C6-10 alcohol ether sulfate, ammonium C10-12 alcohol ether sulfate, or sodium lauryl ether sulfate.

7. The composition of claim 1, wherein the concentration of the auxin herbicide component on an acid equivalence basis is from about 10 wt. % to about 50 wt. %.

8. The composition of claim 1, wherein the acid equivalence weight ratio of the glufosinate component to the auxin herbicide component is from about 1:5 to about 5:1.

9. The composition of claim 1 wherein the monocarboxylic acid and/or salt thereof is formic acid or a salt thereof.

10. The composition of claim 1 wherein the monocarboxylic acid and/or salt thereof is acetic acid or a salt thereof.

11. The composition of claim 1, wherein the monocarboxylic acid and/or salt thereof comprises sodium acetate.

12. The composition of claim 1, wherein the concentration of the monocarboxylic acid and/or salt thereof is from about 3 wt. % to about 30 wt. %.

13. The composition of claim 1, wherein the acid equivalent molar ratio of auxin herbicide component to monocarboxylic acid and/or salt thereof is from about 10:1 to about 1:10.

14. The composition of claim 1, wherein the concentration of the surfactant component is from about 1 wt. % to about 25 wt. %.

15. The composition of claim 1, wherein the surfactant component comprises sodium lauryl ether sulfate.

16. The composition of claim 1, wherein the concentration of the surfactant component is at least about 2 wt. %.

17. The composition of claim 1, wherein the surfactant component further comprises one or more alkylpolysaccharides.

18. The composition of claim 17, wherein the weight ratio of the one or more alkyl ether sulfates to the one or more alkylpolysaccharides is from about 1:1 to about 1:3.

19. The composition of claim 1 wherein the monocarboxylic acid and/or salt thereof comprises potassium acetate.

20. A method of controlling the growth of unwanted plants, the method comprising:
    preparing an aqueous herbicidal application mixture by diluting with water the herbicidal concentrate composition of claim 1; and
    applying an herbicidally effective amount of the application mixture to the unwanted plants.

21. An aqueous herbicidal concentrate composition comprising:
    a glufosinate component;
    an auxin herbicide component;
    a monocarboxylic acid and/or salt thereof; and
    a surfactant component comprising at least one surfactant selected from the group consisting of alkyl sulfates, alkyl ether sulfates, alkyl aryl ether sulfates, alkyl sulfonates, alkyl ether sulfonates, alkyl aryl ether sulfonates, alkylpolysaccharides, amidoalkylamines, alkoxylated alcohols, alkoxylated alkylamines, alkoxylated phosphate esters, and combinations thereof,
    wherein the total herbicide concentration of the composition is at least about 10 wt. %, and
    wherein the auxin herbicide component comprises the monoethanolamine salt of dicamba and the tetrabutylamine salt of dicamba in a molar ratio of from about 1:5 to about 5:1.

* * * * *